US011312857B2

(12) United States Patent
Oiki et al.

(10) Patent No.: US 11,312,857 B2
(45) Date of Patent: Apr. 26, 2022

(54) POLYMERIZABLE COMPOSITION AND MOLDED PRODUCT

(71) Applicant: Mitsui Chemicals, Inc., Tokyo (JP)

(72) Inventors: Motoharu Oiki, Omuta (JP); Koju Okazaki, Omuta (JP)

(73) Assignee: MITSUI CHEMICALS, INC., Tokyo (JP)

( * ) Notice: Subject to any disclaimer, the term of this patent is extended or adjusted under 35 U.S.C. 154(b) by 462 days.

(21) Appl. No.: 16/491,080

(22) PCT Filed: Mar. 7, 2018

(86) PCT No.: PCT/JP2018/008820
§ 371 (c)(1),
(2) Date: Sep. 4, 2019

(87) PCT Pub. No.: WO2018/164194
PCT Pub. Date: Sep. 13, 2018

(65) Prior Publication Data

US 2020/0010665 A1 Jan. 9, 2020

(30) Foreign Application Priority Data

Mar. 8, 2017 (JP) ............................ JP2017-043493

(51) Int. Cl.

| | |
|---|---|
| ***C08L 63/00*** | (2006.01) |
| ***C08G 18/02*** | (2006.01) |
| ***C08G 18/48*** | (2006.01) |
| ***C08L 71/02*** | (2006.01) |
| ***C08L 83/12*** | (2006.01) |
| ***G02B 1/04*** | (2006.01) |

(Continued)

(52) U.S. Cl.
CPC .............. *C08L 63/00* (2013.01); *B29C 33/64* (2013.01); *C08G 18/02* (2013.01); *C08G 18/244* (2013.01); *C08G 18/2875* (2013.01); *C08G 18/3876* (2013.01); *C08G 18/4895* (2013.01); *C08G 18/722* (2013.01); *C08G 18/73* (2013.01); *C08G 18/752* (2013.01); *C08G 18/7642* (2013.01); *C08G 65/336* (2013.01); *C08L 71/02* (2013.01); *C08L 75/04* (2013.01); *C08L 83/10* (2013.01); *C08L 83/12* (2013.01); *C08L 101/00* (2013.01); *G02B 1/04* (2013.01); *G02B 1/041* (2013.01); *C08G 59/20* (2013.01); *C08G 77/46* (2013.01); *C08L 2201/10* (2013.01); *C08L 2205/025* (2013.01); *C08L 2312/00* (2013.01)

(58) Field of Classification Search
CPC .... B29C 33/64; C08G 18/02; C08G 18/4895; C08G 18/3876; C08G 18/722; C08G 18/73; C08G 18/752; C08G 18/7642; C08G 65/336; C08G 59/20; C08G 77/46; C08G 18/2875; C08L 63/00; C08L 71/02; C08L 83/12; C08L 83/10; C08L 75/04; C08L 101/00; C08L 2201/10; C08L 2312/00; C08L 2205/025; G02B 1/041; G02B 1/04
See application file for complete search history.

(56) References Cited

U.S. PATENT DOCUMENTS 5,985,954 A 11/1999 Tsuchida et al.
8,674,038 B2 3/2014 Nakamura et al.
(Continued)

FOREIGN PATENT DOCUMENTS

JP H04353801 A 12/1992
JP H10158473 A 6/1998
(Continued)

OTHER PUBLICATIONS

International Search Report (PCT/ISA/210) dated May 29, 2018, by the Japanese Patent Office as the International Searching Authority for International Application No. PCT/JP2018/008820.
Written Opinion (PCT/ISA/237) dated May 29, 2018, by the Japanese Patent Office as the International Searching Authority for International Application No. PCT/JP2018/008820.

*Primary Examiner* — Patrick D Niland
(74) *Attorney, Agent, or Firm* — Buchanan Ingersoll & Rooney PC

(57) ABSTRACT

A polymerizable composition of the present invention includes a polymerization reactive compound (A), and an internal release agent (B) including a polyether-modified silicone compound (b1) represented by General Formula (1) and a polyether-modified silicone compound (b2) represented by General Formula (2), in which the polymerization reactive compound (A) is one or more compounds selected from a polyiso(thio) cyanate compound, a poly(thio) epoxy compound, a polyoxetanyl compound, a polythietanyl compound, an alkyne compound, a poly(thi)ol compound, a polyamine compound, an acid anhydride, or a polycarboxylic acid compound.

(1)

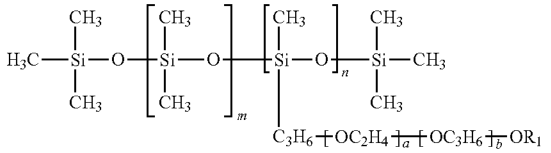

(2)

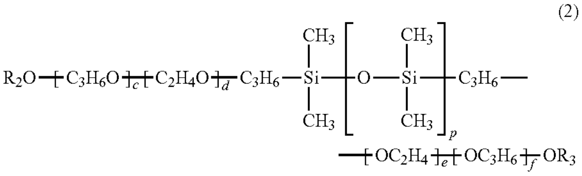

7 Claims, No Drawings

(51) Int. Cl.

| | |
|---|---|
| ***C08G 18/28*** | (2006.01) |
| ***C08G 18/38*** | (2006.01) |
| ***C08G 18/72*** | (2006.01) |
| ***C08G 18/73*** | (2006.01) |
| ***C08G 18/75*** | (2006.01) |
| ***C08G 18/24*** | (2006.01) |
| ***C08G 18/76*** | (2006.01) |
| ***B29C 33/64*** | (2006.01) |
| ***C08G 65/336*** | (2006.01) |
| ***C08L 83/10*** | (2006.01) |
| ***C08L 75/04*** | (2006.01) |
| ***C08L 101/00*** | (2006.01) |
| ***C08G 59/20*** | (2006.01) |
| ***C08G 77/46*** | (2006.01) |

(56) References Cited

U.S. PATENT DOCUMENTS

| | | | |
|---|---|---|---|
| 10,239,239 | B2 | 3/2019 | Okazaki et al. |
| 2010/0256313 | A1 | 10/2010 | Nakamura et al. |
| 2017/0355106 | A1 | 12/2017 | Okazaki et al. |
| 2018/0022860 | A1 | 1/2018 | Ito et al. |

FOREIGN PATENT DOCUMENTS

| | | | |
|---|---|---|---|
| JP | 2009256586 | A | 11/2009 |
| JP | 2013108009 | A | 6/2013 |
| JP | 2014138992 | A | 7/2014 |
| WO | 2016104744 | A1 | 6/2016 |
| WO | 2016125786 | A1 | 8/2016 |

POLYMERIZABLE COMPOSITION AND MOLDED PRODUCT

TECHNICAL FIELD

The present invention relates to a polymerizable composition including an internal release agent and a molded product.

BACKGROUND ART

From the viewpoint that a plastic lens is lightweight and hardly broken as compared with an inorganic lens, it has been rapidly distributed as an optical element for an eyeglass lens, a camera lens, or the like. Various resin materials for a lens have hitherto been developed and used.

A cured product of an epoxy resin and an acid anhydride has advantages such as excellent transparency, excellent heat resistance, and low cost, and thus, it is suitable for a material for a plastic lens. Further, the resin has excellent adhesiveness to glass such that it may be used as an adhesive for glass. In this regard, in a case where a plastic lens is produced by cast polymerization or the like, it has been difficult to release the cured product from a glass mold.

Examples of a technique for improving the releasability from a mold include a technique in which an internal release agent is added to a polymerizable composition.

In Patent Document 1, an epoxy resin composition for encapsulating an optical semiconductor element, which includes an epoxy resin, a curing agent and a release agent, is disclosed. As the release agent, a polyether-modified silicone oil whose side chain moiety is modified with a polyether is used.

Furthermore, in Patent Document 2, a resin composition, which includes an epoxy resin and a silicone compound as a release agent, is disclosed. As the silicone compound, a compound whose terminal is modified with a polyether is used.

In addition, in Example 1 of Patent Document 3, a polymerizable composition, which includes methyl methacrylate, methacrylic acid, and ethylene glycol dimethacrylate as a polymerizable compound, and a polyether-modified silicone oil as a release agent, is disclosed.

RELATED DOCUMENT

Patent Document

[Patent Document 1] JPH10-158473
[Patent Document 2] JP2009-256586
[Patent Document 3] JPH04-353801

SUMMARY OF THE INVENTION

Technical Problem

However, the techniques described in Patent Documents 1 and 2 had problems to be solved from the following viewpoints.

The release agent described in Patent Document 1 does not have sufficient releasability, and the internal release agent described in Patent Document 2 has a problem in a resin becomes turbidity. Thus, both of the release agents have not been able to be used as an internal release agent for a plastic lens.

Therefore, there is a demand for development of an internal release agent which is capable of suppressing the turbidity of a resin and improving releasability as a release agent for use in the production of a plastic lens including a cured product of an epoxy resin and an acid anhydride; and a polymerizable composition including the release agent.

Solution to Problem

Under such circumstances, the present inventors have conducted extensive studies, and as a result, they have discovered a predetermined polyether-modified silicone mixture as a release agent which is capable of releasing a cured product of an epoxy resin and an acid anhydride from a glass mold and suppressing the turbidity of a resin. In addition, they have also found that the polyether-modified silicone exhibits excellent performance as a release agent for the cured product of an epoxy resin and an acid anhydride as well as a release agent for other resins, thereby leading to completion of the present invention.

The present invention is as follows.

[1] A polymerizable composition including:

a polymerization reactive compound (A); and an internal release agent (B) including a polyether-modified silicone compound (b1) represented by General Formula (1) and a polyether-modified silicone compound (b2) represented by General Formula (2), in which the polymerization reactive compound (A) is one or more compounds selected from a polyiso(thio)cyanate compound, a poly(thio)epoxy compound, a polyoxetanyl compound, a polythietanyl compound, an alkyne compound, a poly(thi)ol compound, a polyamine compound, an acid anhydride, and a polycarboxylic acid compound, (1)

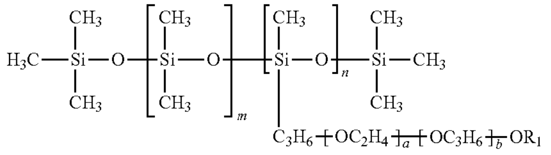

(in Formula (1), m and n may be the same as or different from each other, and represent an integer of 1 or more; a and b may be the same as or different from each other, and represent an integer of 0 or more, provided that a case where both of a and b are 0 is excluded; and $R_1$ represents a linear or branched alkyl group having 1 to 6 carbon atoms or a hydrogen atom)

(2)

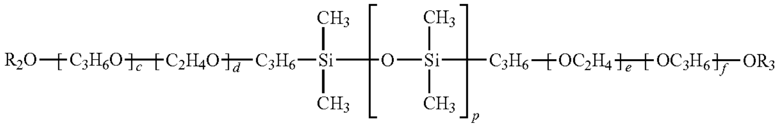

(in Formula (2), p is an integer of 1 or more; c, d, e, and f may be the same as or different from each other, and represent an integer of 0 or more, provided that a case where all of c, d, e, and f are 0 is excluded; and $R_2$ and $R_3$ may be the same as or different from each other, and represent a linear or branched alkyl group having 1 to 6 carbon atoms or a hydrogen atom).

[2] The polymerizable composition according to [1], in which the polymerization reactive compound (A) is a combination of two compounds selected from a poly(thio) epoxy compound, an acid anhydride, a polyiso(thio)cyanate compound, and a poly(thi)ol compound.

[3] The polymerizable composition according to [1] or [2], in which the internal release agent (B) is included in the amount of $1\times10^{-1}$ to $5\times10^{4}$ ppm with respect to the polymerization reactive compound (A).

[4] A molded product formed by curing the polymerizable composition according to any one of [1] to [3].

[5] An optical material including the molded product according to [4].

[6] A plastic lens including the molded product according to [4].

[7] A process for producing a plastic lens, including a step of cast-polymerizing the polymerizable composition according to any one of [1] to [3].

Advantageous Effects of Invention

The polymerizable composition of the present invention makes it possible to achieve sufficient releasability and suppress the turbidity of a resin thus obtained, whereby a molded product having an excellent appearance can be obtained.

DESCRIPTION OF EMBODIMENTS

Hereinafter, the polymerizable composition of the present invention will be described with reference to embodiments.

The polymerizable composition of the present embodiment includes a polymerization reactive compound (A), and an internal release agent (B) including a polyether-modified silicone compound (b1) represented by General Formula (1) and a polyether-modified silicone compound (b2) represented by General Formula (2).

[Polymerization Reactive Compound (A)]

The polymerization reactive compound (A) is one or more compounds selected from a polyiso(thio)cyanate compound, a poly(thio)epoxy compound, a polyoxetanyl compound, a polythietanyl compound, a polyalkene compound, an alkyne compound, a poly(thi)ol compound, a polyamine compound, an acid anhydride, and a polycarboxylic acid compound.

In the present embodiment, from the viewpoint of the effects of the present invention, the polymerization reactive compound (A) is preferably one or more compounds selected from a polyiso(thio)cyanate compound, a poly(thio) epoxy compound, a polyoxetanyl compound, a polythietanyl compound, an alkyne compound, a poly(thi)ol compound, a polyamine compound, an acid anhydride, and a polycarboxylic acid compound, and more preferably two kinds compounds selected from a poly(thio)epoxy compound, an acid anhydride, a polyiso(thio)cyanate compound, and a poly(thi) ol compound.

Examples of the polyiso(thio)cyanate compound include aliphatic polyisocyanate compounds such as tetramethylene diisocyanate, pentamethylene diisocyanate, hexamethylene diisocyanate, heptamethylene diisocyanate, octamethylene diisocyanate, 2,2,4-trimethylhexamethylene diisocyanate, 2,4,4-trimethylhexamethylene diisocyanate, lysine diisocyanatomethyl ester, lysine triisocyanate, xylylene diisocyanate;

alicyclic polyisocyanate compounds such as isophorone diisocyanate, bis(isocyanatomethyl)cyclohexane, bis(isocyanatocyclohexyl)methane, dicyclohexyldimethylmethane isocyanate, 2,5-bis(isocyanatomethyl)bicyclo-[2.2.1]-heptane, 2,6-bis(isocyanatomethyl)bicyclo-[2.2.1]-heptane, 3,8-bis(isocyanatomethyl)tricyclodecane, 3,9-bis(isocyanatomethyl)tricyclodecane, 4,8-bis(isocyanatomethyl) tricyclodecane, and 4,9-bis(isocyanatomethyl) tricyclodecane;

aromatic polyisocyanate compounds such as tolylene diisocyanate, 4,4'-diphenylmethane diisocyanate, diphenyldisulfide-4,4-diisocyanate, and phenylene diisocyanate;

heterocyclic polyisocyanate compounds such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, and 4,5-bis(isocyanatomethyl)-1,3-dithiolane;

aliphatic polyisothiocyanate compounds such as hexamethylene diisothiocyanate, lysine diisothiocyanatomethyl ester, lysine triisothiocyanate, m-xylylene diisothiocyanate, bis(isothiocyanatomethyl)sulfide, bis(isothiocyanatoethyl) sulfide, and bis(isothiocyanatoethyl)disulfide;

alicyclic polyisothiocyanate compounds such as isophorone diisothiocyanate, bis(isothiocyanatomethyl)cyclohexane, bis(isothiocyanatocyclohexyl)methane, cyclohexane diisothiocyanate, methylcyclohexane diisothiocyanate, 2,5-bis(isothiocyanatomethyl)bicyclo-[2.2.1]-heptane, 2,6-bis(isothiocyanatomethyl)bicyclo-[2.2.1]-heptane, 3,8-bis(isothiocyanatomethyl)tricyclodecane, 3,9-bis(isothiocyanatomethyl)tricyclodecane, 4,8-bis (isothiocyanatomethyl)tricyclodecane, and 4,9-bis (isothiocyanatomethyl)tricyclodecane;

aromatic polyisothiocyanate compounds such as tolylene diisothiocyanate, 4,4-diphenylmethane diisothiocyanate, and diphenyldisulfide-4,4-diisocyanate; and sulfur-containing heterocyclic polyisothiocyanate compounds such as 2,5-diisothiocyanatothiophene, 2,5-bis(isothiocyanatomethyl)thiophene, 2,5-isothiocyanatotetrahydrothiophene, 2,5-bis(isothiocyanatomethyl) tetrahydrothiophene, 3,4-bis(isothiocyanatomethyl) tetrahydrothiophene, 2,5-diisothiocyanato-1,4-dithiane, 2,5-bis(isothiocyanatomethyl)-1,4-dithiane, 4,5-diisothiocyanato-1,3-dithiolane, and 4,5-bis (isothiocyanatomethyl)-1,3-dithiolane.

Examples of the polyepoxy compound include an aliphatic glycidyl ether-type epoxy compound, a hydrogenated epoxy compound, an alicyclic epoxy compound, and an aromatic epoxy compound, and these may be used alone or in combination of two or more kinds thereof.

Specific examples of the aliphatic glycidyl ether-type epoxy resins include aliphatic glycidyl ether-type epoxy resins obtained by a condensation reaction of epihalohydrin with ethylene glycol, diethylene glycol, triethylene glycol, tetraethylene glycol, polyethylene glycol (PEG600), propylene glycol, dipropylene glycol, tripropylene glycol, tetrapropylene glycol, polypropylene glycol (PPG), glycerol, diglycerol, tetraglycerol, polyglycerol, trimethylolpropane, and a multimer thereof, pentaerythritol and a multimer thereof, monosaccharides/polysaccharides such as glucose, fructose, lactose, and maltose, or the like; aliphatic glycidyl ether-type epoxy resins having a propylene glycol skeleton, an alkylene skeleton, or an oxyalkylene skeleton.

As the hydrogenated epoxy compound, a polyfunctional glycidyl ether compound having a glycidyl ether group directly or indirectly bonded to a saturated aliphatic cyclic hydrocarbon skeleton (hereinafter also simply referred to as a "polyfunctional glycidyl ether compound") is suitable. Specifically, hydrogenated products of aromatic polyfunctional glycidyl ether compounds such as a bisphenol type epoxy resin is suitable, and these may be used alone or in combination of two or more kinds thereof. The hydrogenated epoxy compound is more preferably a hydrogenated bisphenol A type epoxy resin, a hydrogenated bisphenol S type epoxy resin, a hydrogenated bisphenol F type epoxy resin, or the like, and still more preferably a hydrogenated bisphenol A type epoxy resin, a hydrogenated bisphenol F type epoxy resin, or the like.

Examples of the alicyclic epoxy compound include a polyfunctional alicyclic epoxy compound having an alicyclic epoxy group (hereinafter simply referred to as a "polyfunctional alicyclic epoxy compound"). Specifically, the alicyclic epoxy compound is suitably an epoxy resin having an epoxycyclohexane skeleton (epoxycyclohexane group), an epoxy resin in which an epoxy group is added to a cyclic aliphatic hydrocarbon directly or through a hydrocarbon group, or the like, and these may be used alone or in combination of two or more kinds thereof. The alicyclic epoxy compound is more preferably an epoxy resin having an epoxycyclohexane skeleton. Examples of the epoxy resin having an epoxycyclohexane skeleton include 3,4-epoxycyclohexylmethyl-3,4-epoxycyclohexanecarboxylate, epsilon-caprolactone-modified 3,4-epoxycyclohexylmethyl 3',4'-epoxycyclohexane carboxylate, bis-(3,4-epoxycyclohexyl) adipate, CELL-2021P, CELLOXIDE 2081, and EHPE-3150 (product names, all manufactured by Daicel Chemical Industries, Ltd.).

Examples of alicyclic epoxy compounds other than the epoxy resin having an epoxycyclohexane skeleton include a 1,2-epoxy-4-(2-oxilanyl)cyclohexane adduct of 2,2-bis(hydroxymethyl)-1-butanol, and alicyclic epoxides, such as a hetero ring-containing epoxy resin such as triglycidyl isocyanurate.

Examples of the aromatic epoxy compound include glycidyl compounds having an aromatic ring conjugated system such as a bisphenol skeleton, a fluorene skeleton, a bisphenol skeleton, a naphthalene ring, and an anthracene ring, and these may be used alone or in combination of two or more kinds thereof. The aromatic epoxy compound is preferably an epoxy and/or glycidyl compound (fluorene compound) having a fluorene skeleton.

Preferable examples of the aromatic epoxy compound include an aromatic epoxy compound obtained by a condensation reaction of bisphenols such as bisphenol A, bisphenol F, bisphenol S, and fluorene bisphenol with epihalohydrin, Fluorene Epoxy (manufactured by Osaka Gas Chemical Co., Ltd.) ONCOAT EX-1020 or OGSOL EG210, Fluorene Epoxy (manufactured by Osaka Gas Chemical Co., Ltd.) ONCOAT EX-1010 or OGSOL PG, and a phenyl glycidyl ether, and these may be used alone or in combination of two or more kinds thereof. More preferred examples of the aromatic epoxy compound include a bisphenol A type epoxy resin, Fluorene Epoxy (manufactured by Osaka Gas Chemical Co., Ltd.) OGSOL EG-210, an epi-bis-type glycidyl ether-type epoxy resin, a high-molecular-weight epi-bis-type glycidyl ether-type epoxy resin, a novolac/aralkyl-type glycidyl ether-type epoxy resin, and a phenyl glycidyl ether. Examples of the high-molecular-weight epi-bis-type glycidyl ether-type epoxy resin include a high-molecular-weight epi-bis-type glycidyl ether-type epoxy resin obtained by the addition-reaction of the epi-bis-type glycidyl ether-type epoxy resin with the bisphenols such as bisphenol A, bisphenol F, bisphenol S, and fluorene bisphenol.

Suitable examples of the novolac/aralkyl glycidyl ether-type epoxy resins include those obtained by a condensation reaction of epihalohydrin with polyphenols obtained by a condensation reaction of phenols such as phenol, cresol, xylenol, naphthol, resorcin, catechol, bisphenol A, bisphenol F, bisphenol S, and fluorene bisphenol with formaldehyde, acetaldehyde, propionaldehyde, benzaldehyde, hydroxy benzaldehyde, salichlaldehyde, dicyclopentadiene, terpene, coumarin, paraxylylene glycol dimethyl ether, dichloroperaxylylene, bishydroxymethyl biphenyl, or the like.

Examples of the aromatic epoxy resins include aromatic crystalline epoxy resins obtained by a condensation reaction of epihalohydrin with tetramethylbiphenol, teteramethylbisphenol F, hydroquinone, naphthalenediol, and the like; and high-molecular-weight products of the aromatic crystalline epoxy resins obtained by further addition reaction of the bisphenols, tetramethylbiphenol, tetramethylbisphenol F, hydroquinone, naphthalenediol, or the like; glycidyl ester-type epoxy resins obtained by a condensation reaction of epihalohydrin with tetrahydrophthalic acid, hexahydrophthalic acid, or benzoic acid; and tertiary amine-containing glycidyl ether-type epoxy resins, which are solid at a room temperature, are obtained by a condensation reaction of epihalohydrin with hydantoin, cyanuric acid, melamine, or benzoguanamine.

Examples of the polythioepoxy compound include chained aliphatic 2,3-epoxypropylthio compounds such as bis(2,3-epoxypropyl)sulfide, bis(2,3-epoxypropyl)disulfide, bis(2,3-epoxypropylthio)methane, 1,2-bis(2,3-epoxypropylthio)ethane, 1,2-bis(2,3-epoxypropylthio)propane, 1,3-bis(2,3-epoxypropylthio)propane, 1,3-bis(2,3-epoxypropylthio)-2-methylpropane, 1,4-bis(2,3-epoxypropylthio)butane, 1,4-bis(2,3-epoxypropylthio)-2-methylbutane, 1,3-bis(2,3-epoxypropylthio)butane, 1,5-bis(2,3-epoxypropylthio)pentane, 1,5-bis(2,3-epoxypropylthio)-2-methylpentane, 1,5-bis(2,3-epoxypropylthio)-3-thiapentane, 1,6-bis(2,3-epoxypropylthio)hexane, 1,6-bis(2,3-epoxypropylthio)-2-methylhexane, 3,8-bis(2,3-epoxypropylthio)-3,6-dithiaoctane, 1,2,3-tris(2,3-epoxypropylthio)propane, 2,2-bis(2,3-epoxypropylthio)-1,3-bis(2,3-epoxypropylthiomethyl)propane, 2,2-bis(2,3-epoxypropylthiomethyl)-1-(2,3-epoxypropylthio)butane, 1,5-bis(2,3-epoxypropylthio)-2-(2,3-epoxypropylthiomethyl)-3-thiapentane, 1,5-bis(2,3-epoxypropylthio)-2,4-bis(2,3-epoxypropylthiomethyl)-3-thiapentane, 1-(2,3-epoxypropylthio)-2,2-bis(2,3-epoxypropylthiomethyl)-4-thiahexane, 1,5,6-tris(2,3-epoxypropylthio)-4-(2,3-epoxypropylthiomethyl)-3-thiahexane, 1,8-bis(2,3-epoxypropylthio)-4-(2,3-epoxypropylthiomethyl)-3,6-dithiaoctane, 1,8-bis(2,3-epoxypropylthio)-4,5-bis(2,3-epoxypropylthiomethyl)-3,6-dithiaoctane, 1,8-bis(2,3-epoxypropylthio)-4,4-bis(2,3-epoxypropylthiomethyl)-3,6-dithiaoctane, 1,8-bis(2,3-epoxypropylthio)-2,5-bis(2,3-epoxypropylthiomethyl)-3,6-dithiaoctane, 1,8-bis(2,3-epoxypropylthio)-2,4,5-tris(2,3-epoxypropylthiomethyl)-3,6-dithiaoctane, 1,1,1-tris[[2-(2,3-epoxypropylthio)ethyl]thiomethyl]-2-(2,3-epoxypropylthio)ethane, 1,1,2,2-tetrakis[[2-(2,3-epoxypropylthio)ethyl]thiomethyl]ethane, 1,11-bis(2,3-epoxypropylthio)-4,8-bis(2,3-epoxypropylthiomethyl)-3,6,9-trithiaundecane, 1,11-bis(2,3-epoxypropylthio)-4,7-bis(2,3-epoxypropylthiomethyl)-3,6,9-trithiaundecane, and 1,11-bis(2,3-epoxypropylthio)-5,7-bis(2,3-epoxypropylthiomethyl)-3,6,9-trithiaundecane;

cyclic aliphatic 2,3-epoxypropylthio compounds such as 1,3-bis(2,3-epoxypropylthio)cyclohexane, 1,4-bis(2,3-epoxypropylthio)cyclohexane, 1,3-bis(2,3-epoxypropylthiomethyl)cyclohexane, 1,4-bis(2,3-epoxypropylthiomethyl)cyclohexane, 2,5-bis(2,3-epoxypropylthiomethyl)-1,4-dithiane, 2,5-bis[[2-(2,3-epoxypropylthio)ethyl]thiomethyl]-1,4-dithiane, and 2,5-bis(2,3-epoxypropylthiomethyl)-2,5-dimethyl-1,4-dithiane; and aromatic 2,3-epoxypropylthio compounds such as 1,2-bis(2,3-epoxypropylthio)benzene, 1,3-bis(2,3-epoxypropylthio)benzene, 1,4-bis(2,3-epoxypropylthio)benzene, 1,2-bis(2,3-epoxypropylthiomethyl)benzene, 1,3-bis(2,3-epoxypropylthiomethyl)benzene, 1,4-bis(2,3-epoxypropylthiomethyl)benzene, bis[4-(2,3-epoxypropylthio)phenyl]methane, 2,2-bis[4-(2,3-epoxypropylthio)phenyl]propane, bis[4-(2,3-epoxypropylthio)phenyl]sulfone, bis[4-(2,3-epoxypropylthio)phenyl]sulfide, and 4,4'-bis(2,3-epoxypropylthio)biphenyl.

Examples of the polyoxetanyl compound include 3-ethyl-3-hydroxymethyloxetane, 1,4-bis{[(3-ethyl-3-oxetanyl)methoxy]methyl}benzene, 3-ethyl-3-(phenoxymethyl)oxetane, di[1-ethyl-(3-oxetanyl)]methyl ether, 3-ethyl-3-(2-ethylhexyloxymethyl)oxetane, and phenol novolac oxetane.

Examples of the polythietanyl compound include 1-{4-(6-mercaptomethylthio)-1,3-dithianylthio}-3-{2-(1,3-dithiethanyl)}methyl-7,9-bis(mercaptomethylthio)-2,4,6,10-tetrathiaundecane, 1,5-bis{4-(6-mercaptomethylthio)-1,3-dithianylthio}-3-{2-(1,3-di thiethanyl)}methyl-2,4-dithiapentane, 4,6-bis[3-{2-(1,3-dithiethanyl)}methyl-5-mercapto-2,4-dithiapentylthio]-1,3-dithiane, 3-{2-(1,3-dithiethanyl)}methyl-7,9-bis(mercaptomethylthio)-1,11-dimercapto-2,4,6,10-tetrathiaundecane, 9-{2-(1,3-dithiethanyl)}methyl-3,5,13,15-tetrakis(mercaptomethyl thio)-1,17-dimercapto-2,6,8,10,12,16-hexathiaheptadecane, 3-{2-(1,3-dithiethanyl)}methyl-7,9,13,15-tetrakis(mercaptomethyl thio)-1,17-dimercapto-2,4,6,10,12,16-hexathiaheptadecane, 3,7-bis{2-(1,3-dithiethanyl)}methyl-1,9-dimercapto-2,4,6,8-tetra thianonane, 4,5-bis[1-{2-(1,3-dithiethanyl)}-3-mercapto-2-thiapropylthio]-1,3-dithiolane, 4-[1-{2-(1,3-dithiethanyl)}-3-mercapto-2-thiapropylthio]-5-{1,2-bis(mercaptomethylthio)-4-mercapto-3-thiabutylthio}-1,3-dithiolane, and 4-{4-(5-mercaptomethylthio-1,3-dithiolylthio}-5-[1-{2-(1,3-dithiethanyl)}-3-mercapto-2-thiapropylthio]-1,3-dithiolane.

Examples of the polyalkene compound include polyethylene, polypropylene, polyisobutylene, diethylene glycol bis(allyl carbonate), and divinylbenzene.

Examples of the alkyne compound include hydrocarbon-based alkynes such as 2-butyne, 2-pentyne, 2-hexyne, 3-hexyne, 2-heptyne, 3-heptyne, 2-octyne, 3-octyne, 4-octyne, diisopropyl acetylene, 2-nonyne, 3-nonyne, 4-nonyne, 5-nonyne, 2-decyne, 3-decyne, 4-decyne, 5-decyne, di-tert-butyl acetylene, diphenyl acetylene, dibenzyl acetylene, methyl-iso-propyl acetylene, methyl-tert-butyl acetylene, ethyl-iso-propyl acetylene, ethyl-tert-butyl acetylene, n-propyl-iso-propyl acetylene, n-propyl-tert-butyl acetylene, phenyl methyl acetylene, phenyl ethyl acetylene, phenyl-n-propyl acetylene, phenyl-iso-propyl acetylene, phenyl-n-butyl acetylene, and phenyl-tert-butylacetylene; and alkynyl alcohols such as acetylene diol, propinol, butynol, pentynol, hexynol, hexynediol, heptynol, heptynediol, octynol, and octynediol, and alkynyl amines formed by substitution of some or all OH groups of the alkynyl alcohols with $NH_2$ groups.

Among the poly(thi)ol compounds, examples of the polyol compound include aliphatic polyols such as ethylene glycol, diethylene glycol, propylene glycol, dipropylene glycol, tripropylene glycol, butylene glycol, neopentyl glycol, glycerin, trimethylol ethane, trimethylol propane, ditrimethylol propane, butanetriol, 1,2-methyl glucoside, pentaerythritol, dipentaerythritol, tripentaerythritol, sorbitol, erythritol, threitol, ribitol, arabinitol, xylitol, allitol, mannitol, dulcitol, iditol, glycol, inositol, hexanetriol, triglycerose, diglylcerol, triethylene glycol, polyethylene glycol, tris(2-hydroxyethyl)isocyanurate, cyclobutanediol, cyclopentane diol, cyclohexane diol, cycloheptane diol, cyclooctane diol, cyclohexane dimethanol, hydroxypropyl cyclohexanol, tricyclo[5.2.1.0$^{2,6}$]decane-dimethanol, bicyclo[4.3.0]nonane-diol, dicyclohexanediol, tricyclo[5.3.1.1]dodecanediol, bicyclo[4.3.0]nonanedimethanol, tricyclo[5.3.1.1]dodecane-diethanol, hydroxypropyl tricyclo[5.3.1.1]dodecanol, spiro[3.4]octanediol, butyl cyclohexanediol, 1,1'-bicyclohexylidenediol, cyclohexanetriol, maltitol, and lactose;

aromatic polyols such as dihydroxynaphthalene, trihydroxynaphthalene, tetrahydroxynaphthalene, dihydroxybenzene, benzenetriol, biphenyl tetraol, pyrogallol, (hydroxynaphthyl) pyrogallol, trihydroxyphenanthrene, bisphenol A, bisphenol F, xylylene glycol, di(2-hydroxyethoxy)benzene, bisphenol A-bis-(2-hydroxyethyl ether), tetrabromobisphenol A, and tetrabromobisphenol A-bis-(2-hydroxyethyl ether);

halogenated polyols such as dibromoneopentyl glycol; and polymeric polyols such as an epoxy resin. In the present embodiment, at least one selected from these can be used in combination.

In addition, examples of the polyol compound include condensation reaction products of an organic acid such as oxalic acid, glutamic acid, adipic acid, acetic acid, propionic acid, cyclohexanecarboxylic acid, β-oxocyclohexanepropionic acid, dimer acid, phthalic acid, isophthalic acid, salicylic acid, 3-bromopropionic acid, 2-bromoglycol, dicarboxycyclohexane, pyromellitic acid, butanetetracarboxylic acid, and bromophthalic acid with the polyols;

addition reaction products of the polyols with an alkylene oxide such as ethylene oxide and propylene oxide;

addition reaction product of an alkylenepolyamine with an alkylene oxide such as ethylene oxide and propylene oxide;

bis-[4-(hydroxyethoxy)phenyl]sulfide, bis-[4-(2-hydroxypropoxy)phenyl]sulfide, bis-[4-(2,3-dihydroxypropoxy)phenyl]sulfide, bis-[4-(4-hydroxycyclohexyloxy)phenyl]sulfide, bis-[2-methyl-4-(hydroxyethoxy)-6-butylphenyl]sulfide, and compounds obtained by adding three or less molecules on average of ethylene oxide and/or propylene oxide per hydroxyl group to these compounds; and polyols containing a sulfur atom such as di-(2-hydroxyethyl)sulfide, 1,2-bis-(2-hydroxyethylmercapto)ethane, bis(2-hydroxyethyl)disulfide, 1,4-dithiane-2,5-diol, bis(2,3-dihydroxypropyl)sulfide, tetrakis(4-hydroxy-2-thiabutyl)methane, bis(4-hydroxyphenyl)sulfone (bisphenol S), tetrabromobisphenol S, tetramethyl bisphenol S, 4,4'-thiobis(6-tert-butyl-3-methylphenol), and 1,3-bis(2-hydroxyethylthioethyl)-cyclohexane. In the present embodiment, at least one type selected from these can be used in combination.

Examples of the polythiol compound include aliphatic polythiol compounds such as methanedithiol, 1,2-ethanedithiol, 1,2,3-propanetrithiol, 1,2-cyclohexanedithiol, bis(2-mercaptoethyl)ether, tetrakis(mercaptomethyl)methane, diethylene glycol bis(2-mercaptoacetate), diethylene glycol bis(3-mercaptopropionate), ethylene glycol bis(2-mercaptoacetate), ethylene glycol bis(3-mercaptopropionate), trimethylolpropanetris(2-mercaptoacetate), trimethylolpropanetris(3-mercaptopropionate), trimethylolethanetris(2-mercaptoacetate), trimethylolethanetris(3-mercaptopropionate), pentaerythritoltetrakis(2-mercaptoacetate), pentaerythritoltetrakis(3-mercaptopropionate), bis(mercaptomethyl)sulfide, bis (mercaptomethyl)disulfide, bis(mercaptoethyl)sulfide, bis (mercaptoethyl)disulfide, bis(mercaptopropyl)sulfide, bis (mercaptomethylthio)methane, bis(2-mercaptoethylthio) methane, bis(3-mercaptopropylthio)methane, 1,2-bis (mercaptomethylthio)ethane, 1,2-bis(2-mercaptoethylthio) ethane, 1,2-bis(3-mercaptopropylthio)ethane, 1,2,3-tris (mercaptomethylthio)propane, 1,2,3-tris(2-mercaptoethylthio)propane, 1,2,3-tris(3-mercaptopropylthio)propane, 4-mercaptomethyl-1,8-dimercapto-3,6-dithiaoctane, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, tetrakis(mercaptomethylthiomethyl)methane, tetrakis(2-mercaptoethylthiomethyl)methane, tetrakis(3-mercaptopropylthiomethyl)methane, bis(2,3-dimercaptopropyl)sulfide, 2,5-dimercaptomethyl-1,4-dithiane, 2,5-dimercapto-1,4-dithiane, 2,5-dimercaptomethyl-2,5-dimethyl-1,4-dithiane, and esters of these thioglycolic acid and mercaptopropionic acid, hydroxymethyl sulfide bis(2-mercaptoacetate), hydroxymethyl sulfide bis(3-mercaptopropionate), hydroxyethyl sulfide bis(2-mercaptoacetate), hydroxyethyl sulfide bis(3-mercaptopropionate), hydroxymethyl disulfide bis(2-mercaptoacetate), hydroxymethyl disulfide bis(3-mercaptopropionate), hydroxyethyl disulfide bis(2-mercaptoacetate), hydroxyethyl disulfide bis(3-mercaptopropionate), 2-mercaptoethyl ether bis(2-mercaptoacetate), 2-mercaptoethyl ether bis(3-mercaptopropionate), thiodiglycolic acid bis(2-mercaptoethylester), thiodipropionic acid bis(2-mercaptoethylester), dithiodiglycolic acid bis(2-mercaptoethyl ester), dithiodipropionic acid bis(2-mercaptoethylester), 1,1,3,3-tetrakis(mercaptomethylthio)propane, 1,1,2,2-tetrakis(mercaptomethylthio)ethane, 4,6-bis(mercaptomethylthio)-1,3-dithiane, tris(mercaptomethylthio)methane, and tris (mercaptoethylthio)methane;

aromatic polythiol compounds such as 1,2-dimercaptobenzene, 1,3-dimercaptobenzene, 1,4-dimercaptobenzene, 1,2-bis(mercaptomethyl)benzene, 1,3-bis(mercaptomethyl) benzene, 1,4-bis(mercaptomethyl)benzene, 1,2-bis(mercaptoethyl)benzene, 1,3-bis(mercaptoethyl)benzene, 1,4-bis (mercaptoethyl)benzene, 1,3,5-trimercaptobenzene, 1,3,5-tris(mercaptomethyl)benzene, 1,3,5-tris (mercaptomethyleneoxy)benzene, 1,3,5-tris (mercaptoethyleneoxy)benzene, 2,5-toluenedithiol, 3,4-toluenedithiol, 1,5-naphthalenedithiol, and 2,6-naphthalenedithiol; and heterocyclic polythiol compounds such as 2-methylamino-4,6-dithiol-sym-triazine, 3,4-thiophene dithiol, bismuthiol, 4,6-bis(mercaptomethylthio)-1,3-dithiane, and 2-(2,2-bis(mercaptomethylthio)ethyl)-1,3-dithiethane.

Examples of the polyamine compound include primary polyamine compounds such as ethylene diamine, 1,2-, or 1,3-diaminopropane, 1,2-, 1,3-, or 1,4-diaminobutane, 1,5-diaminopentane, 1,6-diaminohexane, 1,7-diaminoheptane, 1,8-diaminooctane, 1,10-diaminodecane, 1,2-, 1,3-, or 1,4-diaminocyclohexane, o-, m-, or p-diaminobenzene, 3,4- or 4,4'-diaminobenzophenone, 3,4- or 4,4'-diaminodiphenyl ether, 4,4'-diaminodiphenylmethane, 4,4'-diaminodiphenylsulfide, 3,3'- or 4,4'-diaminodiphenylsulfone, 2,7-diaminofluorene, 1,5-, 1,8-, or 2,3-diaminonaphthalene, 2,3-, 2,6-, or 3,4-diaminopyridine, 2,4- or 2,6-diaminotoluene, m-, or p-xylylenediamine, isophoronediamine, diaminomethylbicycloheptane, 1,3- or 1,4-diaminomethylcyclohexane, 2- or 4-aminopiperidine, 2- or 4-aminomethylpiperidine, 2- or 4-aminoethylpiperidine, N-aminoethylmorpholine, and N-aminopropylmorpholine;

monofunctional secondary amine compounds such as diethylamine, dipropylamine, di-n-butylamine, di-sec-butylamine, diisobutylamine, di-n-pentylamine, di-3-pentylamine, dihexylamine, dioctylamine, di(2-ethylhexyl) amine, methylhexylamine, diallylamine, N-methylallylamine, piperidine, pyrrolidine, diphenylamine, N-methylamine, N-ethylamine, dibenzylamine, N-methylbenzylamine, N-ethylbenzylamine, dicyclohexylamine, N-methylaniline, N-ethylaniline, dinaphthylamine, 1-methylpiperazine, and morpholine; and secondary polyamine compounds such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diamino-pentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,5-diaminopentane, N,N'-diethyl-1,6-diaminohexane, N,N'-diethyl-1,7-diaminoheptane, piperazine, 2-methylpiperazine, 2,5-dimethylpiperazine, 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane, and tetramethylguanidine.

Examples of the acid anhydride include succinic anhydride, phthalic anhydride, maleic anhydride, tetrabromophthalic anhydride, tetrahydrophthalic anhydride, hexahydrophthalic anhydride, hexahydro-4-methylphthalic anhydride, methylbicyclo[2.2.1]heptane-2,3-dicarboxylic acid anhydride, bicyclo[2.2.1]heptane-2,3-dicarboxylic acid anhydride, trimellitic anhydride, and dodecylsuccinic anhydride.

Examples of the polycarboxylic acid compound include succinic acid, adipic acid, sebacic acid, azelaic acid, dodecanedioic acid, terephthalic acid, isophthalic acid, orthophthalic acid, phthalic anhydride, tetrahydrophthalic acid, hexahydrophthalic acid, naphthalene dicarboxylic acid, biphenyl dicarboxylic acid, dimer acid, trimellitic acid, pyromellitic acid, and ε-caprolactone.

The polymerization reactive compounds may be used alone or in combination of two or more kinds thereof.

As a polymerization reactive compound other than the polymerization reactive compound (A), a poly(meth)acryloyl compound or the like may be included.

Examples of the poly(meth)acryloyl compound include diacryloyl compounds such as ethylene glycol diacrylate, 1,3-butylene glycol diacrylate, 1,4-butanediol diacrylate, 1,6-hexanediol diacrylate, cyclohexanedimethanol diacrylate, alkoxylated hexanediol diacrylate, neopentyl glycol diacrylate, caprolactone modified neopentyl glycol hydroxypivalate diacrylate, cyclohexanedimethanol diacrylate, diethylene glycol diacrylate, dipropylene glycol diacrylate, bisphenol A diacrylate, ethoxylated bisphenol A diacrylate, hydroxypivalaldehyde modified trimethylolpropane diacrylate, neopentyl glycol diacrylate, polyethylene glycol diacrylate, propoxylated neopentyl glycol diacrylate, tetraethylene glycol diacrylate, tricyclodecane dimethanol diacrylate, triethylene glycol diacrylate, and tripropylene glycol diacrylate; triacryloyl compounds such as glycerol triacrylate, ethoxylated trimethylolpropane triacrylate, pentaerythritol triacrylate, propoxylated glyceryl triacrylate, propoxylated trimethylolpropane triacrylate, and tris(2-hydroxyethyl)isocyanurate triacrylate; and tetraacryloyl compounds such as ditrimethylolpropane tetraacrylate, dipentaerythritol pentaacrylate, ethoxylated pentaerythritol tetraacrylate, pentaerythritol tetraacrylate, and caprolactone-modified dipentaerythritol hexaacrylate.

The polymerization reactive compounds included in the composition of the present embodiment will be described below in more detail. The polymerization reactive compounds can be classified into (Group I) and (Group II) according to reactivity.

(Group I): A polyiso(thio)cyanate compound, a poly(thio) epoxy compound, a polyoxetanyl compound, a polythietanyl compound, a polyalkene compound, or an alkyne compound can be classified into (Group I) as a self-polymerizable or copolymerizable compound, provided that (Group I) does not include the following (Group II).

(Group II): A poly(thi)ol compound, a polyamine compound, an acid anhydride, or a polycarboxylic acid compound can be classified into (Group II) as an addition-polymerizable compound, provided that the (Group II) does not include (Group I).

In a case where the polymerization reactive compound is used alone, any one compound selected from (Group I) or (Group II) is selected. In a case where the polymerization reactive compound is used alone (one type), one compound selected from (Group I) which is a self-polymerizable or copolymerizable is more easily cured than one compound selected from (Group II) which is an addition-polymerizable, and thus, this is preferable.

In a case where two or more of the polymerization reactive compounds are used, a method of mixing two or more compounds selected from only (Group I), two or more compounds selected from only (Group II), or one or more compounds selected from (Group I) and one or more compounds selected from (Group II) can be exemplified.

In addition, the poly(meth)acryloyl compounds are used alone in no case, but are used in combination with anyone or more compounds selected from (Group II).

The polyiso(thio)cyanate compound classified into a self-polymerizable or copolymerizable compound tends to have lower self-polymerizability than other compounds classified into (Group I) or lower reactivity of copolymerization with (Group I) compounds, and if selecting conditions, a self-polymerization reaction-type polymer such as a 1-nylon-type polymer or an isocyanurate-type polymer is obtained in some cases. Further, in the copolymerization with a poly (thio)epoxy compound, an ethylene carbonate-type copolymerization polymer is obtained in some cases.

Even in the case where two or more are selected from only the addition-polymerizable compounds (Group II), it is generally difficult to perform polymerization, but in a case where an acid anhydride and a poly(thi)ol compound are combined with each other, in a case where an acid anhydride and a polyamine compound are combined with each other, or in a case where three types of an acid anhydride, a poly(thi)ol compound, and a polyamine compound are combined with each other, there is a tendency that polymerization reaction is likely to proceed and a curable resin is obtained. The blending ratio of the acid anhydride to the poly(thi)ol or the polyamine in terms of a functional group molar ratio of the acid anhydride group of the acid anhydride/the mercapto group of the poly(thi)ol (or the amino group of the polyamine) is in a range of approximately 8/2 to 2/8, preferably in a range of 6/4 to 4/6, and more preferably in a range of range of 55/45 to 45/55.

The blending ratio in a case where both (Group I) and (Group II) are used is in a range of about 999/1 to 1/9, preferably in a range of 99/1 to 10/90, more preferably in a range of 9/1 to 3/7, and most preferably in a range of 7/3 to 4/6, in a case where the blending ration is expressed in a functional group molar ratio of the polymerizable functional group of (Group I)/the polymerizable functional group of (Group II).

In the present embodiment, from the viewpoint that an effect of improving the releasability and the alleviation of turbidity is remarkably approved in the poly(thio)urethane resin, it is preferable that the internal release agent (B) uses a combination of a polyiso(thio)cyanate compound in (Group I) and a poly(thi)ol compound in (Group II), or a combination of a poly(thio)epoxy compound in (Group I) and an acid anhydride in (Group II) as the polymerization reactive compound.

[Internal Release Agent (B)]

The internal release agent (B) includes a polyether-modified silicone compound (b1) represented by General Formula (1) and a polyether-modified silicone compound (b2) represented by General Formula (2).

(1)

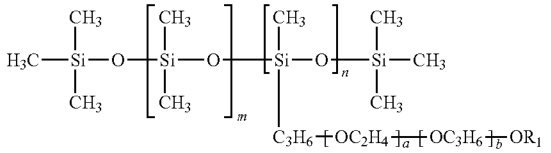

In Formula (1), m and n may be the same as or different from each other, and represents an integer 1 or more. m is preferably 1 to 500, and more preferably 10 to 300. n is preferably 1 to 100, and more preferably 1 to 50.

a and b may be the same as or different from each other, and represent an integer of 0 or more, provided that a case where a and b are both 0 is excluded. a is preferably 0 to 50, and more preferably 1 to 30. b is preferably 0 to 50, and more preferably 0 to 30.

$R_1$ represents a linear or branched alkyl group having 1 to 6 carbon atoms or a hydrogen atom. $R_1$ is preferably a hydrogen atom.

Furthermore, a, b, m, and n are each a number such that the weight-average molecular weight of the polyether-modified silicone compound is 1,000 to 100,000, the content ratio (molar ratio) of the silicone units $\{[(m+n+2)/(m+n+2+a+b+1)]\times 100\}$ is 10% to 70%, and the content ratio (molar ratio) of the polyether units $\{[(a+b+1)/(m+n+2+a+b+1)]\times 100\}$ is 30% to 90%.

(2)

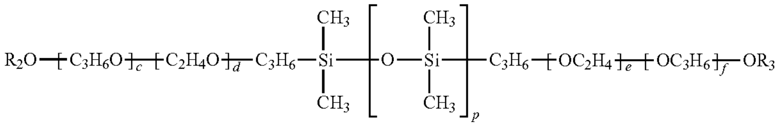

In Formula (2), p is an integer of 1 or more. p is preferably 1 to 500, and more preferably 10 to 300.

c, d, e, and f may be the same as or different from each other, and represent an integer of 0 or more, provided that a case where all of c, d, e, and f are 0 is excluded. c and f are each preferably 0 to 50, and more preferably 1 to 30. d and e are each preferably 0 to 50, and more preferably 0 to 30.

$R_2$ and $R_3$ may be the same as or different from each other, and represent a linear or branched alkyl group having 1 to 6 carbon atoms or a hydrogen atom. $R_2$ and $R_3$ are each preferably a hydrogen atom.

Moreover, c, d, e, f, and p are each numbers such that the weight-average molecular weight of the polyether-modified silicone compound is 1,000 to 100,000, the content ratio (molar ratio) of the silicone units $\{[(p+1)/(p+1+c+d+e+f+2)]\times 100\}$ is 10% to 70%, and the content ratio (molar ratio) of the polyether units $\{[(c+d+e+f+2)/(p+1+c+d+e+f+2)]\times 100\}$ is 30% to 90%.

In the present embodiment, from the viewpoint of the effects of the present invention, the internal release agent (B) may include the polyether-modified silicone compound (b1) and the polyether-modified silicone compound (b2) at a ratio of 5:95 to 95:5, preferably 10:90 to 90:10, and more preferably 20:80 to 80:20.

The internal release agent (B) may contain at least one or more of each of the polyether-modified silicone compound (b1) and the polyether-modified silicone compound (b2).

Furthermore, a, b, c, d, e, f, m, n, and p are each a value determined from an integral value of signals in $^1$H-NMR by a nuclear magnetic resonance (NMR) method.

[Other Components]

Other components may be included, in addition to the polymerization reactive compound (A) and internal the release agent (B), in the polymerizable composition of the present embodiment.

Examples of such other components include a monofunctional iso(thio)cyanate compound, a monofunctional (thio epoxy compound, a monofunctional oxetanyl compound, a monofunctional thietanyl compound, a monofunctional (meth)acryloyl compound having one functional group arbitrarily selected from a methacryloyloxy group, an acryloyloxy group, a methacryloylthio group, an acryloylthio group, a methacrylamide group, and an acrylamide group, a monofunctional alkene compound having one polymerizable carbon-carbon double bond other than a methacryloyloxy group, an acryloyloxy group, a methacryloyloxythio group, an acryloylthio group, a methacrylamide group, and an acrylamide group, a monofunctional alcohol compound other than alcohols used as a solvent, a monofunctional thiol compound, a monofunctional amine compound having one functional group arbitrarily selected from an amino group and a secondary amino group, a monofunctional carboxylic acid compound having one carboxyl group, a solvent, and moisture.

In a process for producing a molded product by cast-polymerizing the composition in the present embodiment, a polymerization catalyst or a thermal polymerization initiator is added, as desired, in the case of performing curing by heat, and a photopolymerization initiator is added in the case of performing curing by radiation other than infrared rays (heat) such as ultraviolet rays.

Examples of the polymerization catalyst include a Lewis acid, an amine, a tertiary amine compound and an inorganic acid salt or organic acid salt thereof, a metal compound, a quaternary ammonium salt, and an organic sulfonic acid.

The amount of the polymerization catalyst to be used is preferably in a range of 5 ppm to 15% by weight, more preferably in a range of 10 ppm to 10% by weight, and still more preferably in a range of 50 ppm to 3% by weight, with respect to the polymerizable composition.

Examples of the metal compound used as the polymerization catalyst include dimethyl tin chloride, dibutyl tin chloride, and dibutyl tin laurate.

Examples of the thermal polymerization initiator used include ketone peroxide compounds such as methyl isobutyl ketone peroxide and cyclohexanone peroxide;

diacyl peroxide compounds such as isobutyryl peroxide, o-chlorobenzoyl peroxide, and benzoyl peroxide;

dialkyl peroxide compounds such as tris(t-butylperoxy) triazine and t-buthylcumyl peroxide;

peroxyketal compounds such as 1,1-di(t-hexylperoxy) cyclohexane, 2,2-bis(4,4-di-t-butylperoxycyclohexyl)propane, and 2,2-di(t-butylperoxy)butane;

alkyl perester compounds such as α-cumylperoxyneodecanoate, t-butylperoxypivalate, 2,4,4-trimethylphenylperoxy-2-ethyl hexanoate, t-butylperoxy-2-ethyl hexanoate, and t-butylperoxy-3,5,5-trimethyl hexanoate; and peroxycarbonate compounds such as di-3-methoxybutyl peroxydicarbonate, bis(4-t-butylcyclohexyl) peroxydicarbonate, t-butyl peroxyisopropyl carbonate, and diethylene glycol bis(t-butylperoxycarbonate).

Examples of the photopolymerization initiator used include a photoradical polymerization initiator, a photocationic polymerization initiator, and a photoanionic polymerization initiator, and among these photopolymerization initiators, a photoradical polymerization initiator is preferable.

Examples of the photoradical polymerization initiator include Irgacure 127 (manufactured by BASF Corporation), IRGACURE 651 (manufactured by BASF Corporation), IRGACURE 184 (manufactured by BASF Corporation), DAROCURE 1173 (manufactured by BASF Corporation), benzophenone, 4-phenyl benzophenone, IRGACURE 500 (manufactured by BASF Corporation), IRGACURE 2959 (manufactured by BASF Corporation), IRGACURE 907 (manufactured by BASF Corporation), IRGACURE 369 (manufactured by BASF Corporation), IRGACURE 1300 (manufactured by BASF Corporation), IRGACURE 819 (manufactured by BASF Corporation), IRGACURE 1800 (manufactured by BASF Corporation), DAROCURE TPO (manufactured by BASF Corporation), DAROCURE 4265 (manufactured by BASF Corporation), IRGACURE OXE01 (manufactured by BASF Corporation), IRGACURE OXE02 (manufactured by BASF Corporation), ESACURE KT55 (manufactured by Lamberti S.p.A.), ESACURE ONE (manufactured by Lamberti S.p.A.), ESACURE KIP150 (manufactured by Lamberti S.p.A.), ESACURE KIP100F (manufactured by Lamberti S.p.A.), ESACURE KT37 (manufactured by Lamberti S.p.A.), ESACURE KT046 (manufactured by Lamberti S.p.A.), ESACURE 1001M (manufactured by Lamberti S.p.A.), ESACURE KIP/EM (manufactured by Lamberti S.p.A.), ESACURE DP250 (manufactured by Lamberti S.p.A.), ESACURE KB1 (manufactured by Lamberti S.p.A.), and 2,4-diethyl thioxanthone.

Among these photoradical polymerization initiators, IRGACURE 127 (manufactured by BASF Corporation), IRGACURE 184 (manufactured by BASF Corporation), DAROCURE 1173 (manufactured by BASF Corporation), IRGACURE 500 (manufactured by BASF Corporation), IRGACURE 819 (manufactured by BASF Corporation), DAROCURE TPO (manufactured by BASF Corporation), ESACURE ONE (manufactured by Lamberti S.p.A.), ESACURE KIP100F (manufactured by Lamberti S.p.A.), ESA- CURE KT37 (manufactured by Lamberti S.p.A.), ESACURE KT046 (manufactured by Lamberti S.p.A.), or the like is preferable.

Examples of the photocationic polymerization initiator include IRGACURE 250 (manufactured by BASF Corporation), IRGACURE 784 (manufactured by BASF Corporation), ESACURE 1064 (manufactured by Lamberti S.p.A.), CYRAURE UVI6990 (manufactured by Union Carbide Corporation Japan), ADEKA OPTOMER SP-172 (manufactured by ADEKA Corporation), ADEKA OPTOMER SP-170 (manufactured by ADEKA Corporation), ADEKA OPTOMER SP-152 (manufactured by ADEKA Corporation), and ADEKA OPTOMER SP-150 (manufactured by ADEKA Corporation).

In a case where the photopolymerization initiator is used, a photopolymerization accelerator may be used in combination therewith. Examples of the photopolymerization accelerator include 2,2-bis(2-chlorophenyl)-4,5'-tetraphenyl-2'H-<1,2'>biimidazolyl, tris(4-dimethylaminophenyl) methane, 4,4'-bis(dimethylamino)benzophenone, 2-ethylanthraquinone, and camphorquinone.

The amount of the photopolymerization initiator and the thermal polymerization initiator to be used is preferably in a range of 0.1% to 20% by weight, more preferably in a range of 0.5% to 10% by weight, and still more preferably in a range of 1% to 5% by weight, in the polymerizable composition.

In order to prevent a change in quality even in a case where a molded product including the cured resin in the present embodiment is exposed to the outside for a long period of time, it is preferable that an ultraviolet absorber and a hindered amine-based light stabilizer are further added to the composition in the present embodiment, and the composition at which weather resistance is imparted is obtained.

The ultraviolet absorber is not particularly limited, and for example, various ultraviolet absorbers such as a benzotriazole-based ultraviolet absorber, a triazine-based ultraviolet absorber, a benzophenone-based ultraviolet absorber, a benzoate-based ultraviolet absorber, a propanedioic acid ester-based ultraviolet absorber, and an oxanilide-based ultraviolet absorber can be used.

Specific examples of the ultraviolet absorber include benzotriazole-based ultraviolet absorbers such as 2-(2H-benzotriazol-2-yl)-4-methyl-6-(3,4,5,6-tetrahydrophthalimidylmethyl)phenol, 2-(2H-benzotriazol-2-yl)-p-cresol, 2-(2H-benzotriazol-2-yl)-4-tert-butylphenol, 2-(2H-benzotriazol-2-yl)-4,6-di-tert-butylphenol, 2-(2H-benzotriazol-2-yl)-4,6-bis(1-methyl-1-phenylethyl)phenol, 2-(2H-benzotriazol-2-yl)-4-(1,1,3,3-tetramethylbutyl)-6-(1-methyl-1-phenylethyl)phenol, 2-(2H-benzotriazol-2-yl)-4-(3-one-4-oxa-dodecyl)-6-tert-butyl-phenol, 2-{5-chloro(2H)-benzotriazol-2-yl}-4-(3-one-4-oxa-dodecyl)-6-tert-butyl-phenol, 2-{5-chloro(2H)-benzotriazol-2-yl}-4-methyl-6-tert-butyl-phenol, 2-(2H-benzotriazol-2-yl)-4,6-di-tert-pentylphenol, 2-{5-chloro(2H)-benzotriazol-2-yl}-4,6-di-tert-butylphenol, 2-(2H-benzotriazol-2-yl)-4-tert-octylphenol, 2-(2H-benzotriazol-2-yl)-4-methyl-6-n-dodecylphenol, octyl 3-[3-tert-butyl-5-(5-chloro-2H-benzotriazol-2-yl)-4-hydroxyphenyl]propionate, 2-ethylhexyl 3-[3-tert-butyl-5-(5-chloro-2H-benzotriazol-2-yl)-4-hydroxyphenyl]propionate, a reaction product of methyl-3-{3-(2H-benzotriazol-2-yl)-5-tert-butyl-4-hydroxyphenyl}propionate/polyethylene glycol 300, product name Viosorb 583 (manufactured by Kyodo Chemical Co., Ltd.), product name Tinuvin 326 (manufactured by BASF Corporation), product name Tinuvin 384-2 (manufactured by BASF Corporation), product name Tinuvin PS (manufactured by BASF Corporation), product name Seesorb 706 (manufactured by SHIPRO KASEI KAISHA LTD.), and product name EVERSORB 109 (manufactured by Everlight Chemical Industrial Corporation); triazine-based ultraviolet absorbers such as 2-(4-phenoxy-2-hydroxy-phenyl)-4,6-diphenyl-1,3,5-triazine, 2-(2-hydroxy-4-oxa-hexadecyloxy)-4,6-di(2,4-dimethyl-phenyl)-1,3,5-triazine, 2-(2-hydroxy-4-oxa-heptadecyloxy)-4,6-di(2,4-dimethyl-phenyl)-1,3,5-triazine, 2-(2-hydroxy-4-iso-octyloxy-phenyl)-4,6-di(2,4-dimethyl-phenyl)-1,3,5-triazine, product name Tinuvin 400 (manufactured by BASF Corporation), product name Tinuvin 405 (manufactured by BASF Corporation), product name Tinuvin 460 (manufactured by BASF Corporation), and product name Tinuvin 479 (manufactured by BASF Corporation); benzophenone-based ultraviolet absorbers such as 2-hydroxy-4-n-methoxybenzophenone and 2-hydroxy-4-n-octoxybenzophenone; benzoate-based ultraviolet absorbers such as 2,4-di-tert-butylphenyl-3,5-di-tert-butyl-4-hydroxybenzoate; propanedioic acid ester-based ultraviolet absorbers such as propanedioic acid-{(4-methoxyphenyl)-methylene}-dimethyl ester, product name Hostavin PR-25 (manufactured by Clariant Japan K.K.), and product Name Hostavin B-CAP (manufactured by Clariant Japan K.K.); and oxanilide-based ultraviolet absorbers such as 2-ethyl-2'-ethoxy-oxanilide and product Name Sanduvor VSU (manufactured by Clariant Japan K. K.). Among these ultraviolet absorbers, the benzotriazole-based ultraviolet absorbers and the triazine-based ultraviolet absorbers tend to be preferable.

Incidentally, a light control dye or a light control coloring agent may be added for the purpose of imparting light control properties. As the representative light control dyes or light control coloring agents, it is possible to use one or more compounds selected from, for example, a spiropyran-based compound, a spirooxazine-based compound, a fulgide-based compound, a naphthopyran-based compound, and a bisimidazole compound, depending on the desired coloration.

Various additives such as a polymerization accelerator, a catalyst, an infrared absorbent, a radical scavenger, an antioxidant, a polymerization inhibitor, a non-light control dye and coloring agent, a binder, a dispersant, a leveling agent, and organic or inorganic particles having a nanometer size may further be added to the composition in the present embodiment, as desired.

<Polymerizable Composition>

The polymerizable composition of the present embodiment can be prepared by mixing the polymerization reactive compound (A) and the internal release agent (B), and the other components, as desired.

From the viewpoint of the effects of the present invention, the polymerizable composition can include the internal release agent (B) in the amount of $1\times10^{-1}$ to $5\times10^{4}$ ppm, preferably 1 to $4\times10^{4}$ ppm, more preferably 5 to $3\times10^{4}$ ppm, and particularly preferably 10 to $1\times10^{4}$ ppm, with respect to the polymerization reactive compound (A).

In a case where the amount of the internal release agent (B) to be added is within the range, the releasability and the transparency of the molded product are particularly excellent, and these characteristics can further be satisfied.

In a case where the polymerizable composition is prepared by mixing the component (A), the component (B), and the other components, the mixing is usually performed at a temperature of 25° C. or lower. It is preferable to employ a further lower temperature from the viewpoint of the pot life of the polymerizable composition. However, in a case where the solubility of the catalyst, the internal release agent, or the additives in a solvent is poor, it is also possible to dissolve the catalyst, the internal release agent, or the additives in a monomer and a resin modifier by heating them in advance.

<Molded Product>

In the present embodiment, the process for producing the molded product is not particularly limited, but preferred examples of the production method include cast polymerization. Firstly, a polymerizable composition is injected into a cavity in a mold held with a gasket, a tape, or the like. Here, it is preferable in many cases to subject a plastic lens thus obtained to a degassing treatment under reduced pressure, a filtration treatment, for example, under pressurization or reduced pressure, or the like.

The polymerization condition is not particularly limited since it significantly varies depending on the composition of a polymerizable composition, the type and use amount of a catalyst, the shape of a mold, and the like. However, the polymerization is performed at a temperature of approximately −50° C. to 150° C. for 1 to 50 hours. In some cases, it is preferable to maintain or slowly raise the temperature in the range of 10° C. to 150° C., and perform curing for 1 to 48 hours.

The molded product may be subjected to a treatment such as annealing, as desired. The treatment is usually performed at a temperature between 50° C. and 150° C., but is preferably performed at 90° C. to 140° C., and more preferably at 100° C. to 130° C.

In the present embodiment, various additives such as a chain extension agent, a crosslinking agent, a light stabilizer, an anti-oxidant, a bluing agent, an oil-soluble dye, a filler, and an adhesiveness improver may be added in the same manner as a known molding method, depending on the purposes, in the production of a molded product.

The molded product of the present embodiment can be obtained as a molded product having one of various shapes by changing the type of a mold during cast polymerization.

Since the molded product formed by curing of the polymerizable composition of the present embodiment has excellent appearance due to its sufficient releasability and suppressed turbidity. Accordingly, the molded product can be used for various optical materials such as a plastic lens. In particular, the molded product can be used as a plastic eyeglass lens or a plastic polarized lens.

The cured resin constituting a molded product in the present embodiment is preferably a cured resin obtained from a liquid polymerizable composition which is easily subjected to a cast operation, and among the cured resins, cured resins described in (a) to (w) below are preferable.

(a) A poly(thio)urethane resin formed by the polymerization of a polyiso(thio)cyanate compound and a poly(thi)ol compound In the present application, the poly(thio)urethane resin means a polyurethane resin, a polythiourethane resin, or a polydithiourethane resin.

(b) A poly(thio)urea resin formed by the polymerization of a polyisocyanate compound or a polyisothiocyanate compound, and a polyamine compound In the present application, the poly(thio)urea resin means a polyurea resin or a polythiourea resin.

(c) A poly(thio)epoxy resin formed by the polymerization of a poly(thio)epoxy compound (d) A poly(thio)epoxy-poly(thi)ol resin formed by the polymerization of a poly(thio)epoxy compound and a poly(thi)ol compound (e) A poly(thio)epoxy-polyamine resin formed by the polymerization of a poly(thio)epoxy compound and a polyamine compound (f) A poly(thio)epoxy-acid anhydride resin formed by the polymerization of a poly(thio)epoxy compound and an acid anhydride (g) A poly(meth)acryloyl-poly(thi)ol resin formed by the polymerization of a poly(meth)acryloyl compound and a poly(thi)ol compound (h) A poly(meth)acryl-polyalkyne resin formed by the polymerization of a poly(meth)acryloyl compound and an alkyne compound (i) A poly(meth)acryl-polyamine resin formed by the polymerization of a poly(meth)acryloyl compound and a polyamine compound (j) A polyalkene-poly(thi)ol resin formed by the polymerization of a polyalkene compound and a poly(thi)ol compound (k) A polyalkene-polyamine resin formed by the polymerization of a polyalkene compound and a polyamine compound (l) A polyalkyne resin formed by the polymerization of an alkyne compound (m) A polyalkyne-poly(thi)ol resin formed by the polymerization of an alkyne compound and a poly(thi)ol compound (n) A polyalkyne-polyamine resin formed by the polymerization of an alkyne compound and a polyamine compound (o) A polyalkyne-polyalkene resin formed by the polymerization of an alkyne compound and an alkene compound (p) A polyoxetanyl resin formed by the polymerization of an oxetanyl compound (q) A polyoxetanyl-poly(thi)ol resin formed by the polymerization of an oxetanyl compound and a poly(thi)ol compound (r) A polyoxetanyl-polyamine resin formed by the polymerization of an oxetanyl compound and a polyamine compound (s) A polyoxetanyl-acid anhydride resin formed by the polymerization of an oxetanyl compound and an acid anhydride (t) A polythiethanyl-poly(thi)ol resin formed by the polymerization of a thiethanyl compound and a poly(thi)ol compound (u) A polythietanyl-polyamine resin formed by the polymerization of a thiethanyl compound and a polyamine compound (v) A polythietanyl-acid anhydride resin formed by the polymerization of a thiethanyl compound and an acid anhydride (w) A mixed resin formed by the copolymerization of two or more resins selected from (a) to (v)

Among the cured resins in (a) to (w), more preferred examples of the cured resin include the resins described in (a) to (h) and (p) to (w), and mixed resins thereof (mixtures of a copolymer and a resin), and still more preferred examples thereof include the resins described in (a) to (f), (p) to (s), and (w), and mixed resins thereof.

In the present embodiment, from the viewpoint that an effect of improving the releasability and the turbidity of the internal release agent (B) is remarkably approved, (a) or (f) is particularly preferable as the cured resin.

In the present embodiment, in a case where the polymerization reactive compound is a combination of m-xylylene diisocyanate and 4-mercaptomethyl-1,8-dimercapto-3,6-dithiaoctane, a combination of 2,5(6)-bis(isocyanatomethyl) bicyclo-[2.2.1]-heptane, pentaerythritoltetrakis(3-mercaptopropionate), and 4-mercaptomethyl-1,8-dimercapto-3,6-dithiaoctane, a combination of m-xylylene diisocyanate, and the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, the amount of the internal release agent (B) to be added is 100 to 900 ppm, preferably 300 to 700 ppm, and more preferably 400 to 600 ppm, with respect to the total amount of the polymerization reactive compound.

In a case where the polymerization reactive compound is a combination of 2,5(6)-bis(isocyanatomethyl)bicyclo-[2.2.1]-heptane, hexamethylene diisocyanate, pentaerythritoltetrakis(3-mercaptopropionate), and 4-mercaptomethyl-1,8-dimercapto-3,6-dithiaoctane, the amount of the internal release agent (B) to be added is 2 to 3,000 ppm, preferably 3 to 2,000 ppm, and more preferably 5 to 1,000 ppm. In a case where the monomer constituting the resin (a) is a combination of bis(4-isocyanatocyclohexyl)methane, and the mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane, the amount of the internal release agent (B) to be added is 2 to 300 ppm, preferably 3 to 100 ppm, and more preferably 5 to 15 ppm.

In addition, in a case where the polymerization reactive compound includes a poly(thio)epoxy compound and an acid anhydride, the amount of the internal release agent (B) to be added is 3,000 to 30,000 ppm, preferably 4,000 to 20,000 ppm, and more preferably 5,000 to 10,000 ppm, with respect to the total amount of the polymerization reactive compound.

In a case where the amount of the internal release agent (B) to be added is within the range, the releasability and the transparency of the molded product are particularly excellent, and these characteristics can further be satisfied at the same time.

[Plastic Eyeglass Lens]

The plastic eyeglass lens using a lens base material including the molded product of the present embodiment may be used by providing a coating layer on one side or both sides, as desired.

The plastic eyeglass lens of the present embodiment includes a lens base material including the above-mentioned polymerizable composition and a coating layer.

Specific examples of the coating layer include a primer layer, a hard coat layer, an anti-reflection layer, an anti-fog coating layer, an anti-fouling layer, and a water-repellent layer. These coating layers may be used alone, or a plurality of coating layers may be used in multiple layers. In a case where the coating layers are formed on both sides, the same coating layers or different coating layers may be provided on each of the surfaces.

An infrared absorber for the purpose of protecting eyes from infrared rays; a light stabilizer or an anti-oxidant for improving weather resistance of a lens; a photochromic compound; a dye or pigment for the purpose of enhancing fashionability of a lens; an anti-static agent; and various other additives for the purpose of enhancing the performance of a lens may be used in combination for these coating layers.

In addition, various leveling agents may be used for the purpose of improving applicability for a layer with coating by application.

A primer layer is usually formed between a hard coat layer which will be described later and a lens. The primer layer is a coating layer for the purpose of improving the adhesiveness between the hard coat layer formed thereon and the lens, and in some cases, it can improve impact resistance. As the primer layer, any materials can be used as long as they have high adhesiveness to the obtained lens. Usually, a primer composition having a urethane-based resin, an epoxy-based resin, a polyester-based resin, a melanin-based resin, or a polyvinyl acetal as a main component, or the like is used. A suitable solvent which does not affect the lens may be used for the primer composition for the purpose of adjusting the viscosity of the composition. Of course, a solvent may not be used.

The primer layer can also be formed by any method of a coating method and a dry method. In a case of using the coating method, the primer layer is formed by applying a primer composition onto a lens by a known method such as spin coating a dip coating, followed by solidification. In a case of performing the dry method, the primer layer is formed by a known dry method such as a CVD method and a vacuum deposition method. In the formation of the primer layer, the surface of a lens may have been subjected to a pretreatment such as an alkali treatment, a plasma treatment, and an ultraviolet treatment, in advance, for the purpose of enhancing the adhesiveness.

The hard coat layer is a coating layer having a purpose of providing the surface of the lens with functions such as scratch resistance, abrasion resistance, moisture resistance, hot water resistance, heat resistance, and weather resistance.

For the hard coat layer, a hard coat composition including an organosilicon compound having curability, one or more fine particles of oxides of an element selected from an element group consisting of Si, Al, Sn, Sb, Ta, Ce, La, Fe, Zn, W, Zr, In, and Ti, and/or one or more fine particles including composite oxides of two or more elements selected from the element group is generally used.

It is preferable that the hard coat composition includes, in addition to above, at least any one of amines, amino acids, metal acetylacetonate complexes, metal salts of organic acids, perchloric acids, salts of perchloric acids, acids, metal chlorides, and polyfunctional epoxy compounds. For the hard coat composition, a suitable solvent which does not affect a lens or a solvent may not be used.

The hard coat layer is usually formed by applying a hard coat composition by a known application method such as spin coating and dip coating, followed by curing. Examples of the curing method include thermosetting, and a curing method through irradiation with energy rays such as ultraviolet rays and visible light. In order to suppress the occurrence of interference fringes, it is preferable that a difference between the refractive index of the hard coat layer and the refractive index of the lens is in the range of ±0.1.

An antireflection layer is formed on the hard coat layer, as desired. The antireflection layer may be an inorganic-based antireflection layer or an organic-based antireflection layer. In the case of the inorganic-based antireflection layer, the layer is formed by a dry method such as a vacuum deposition method, a sputtering method, an ion plating method, an ion beam assist method, and a CVD method, using an inorganic oxide such as $SiO_2$ and $TiO_2$. In the case of the organic-based antireflection layer, the layer is formed by a wet method using a composition including an organosilicon compound and silica-based fine particles having internal pores.

The antireflection layer may be a single layer or a multiple layer, and in a case of using the single layer as the antireflection layer, it is preferable that the refractive index is lowered by at least 0.1 or more than that of the hard coat layer. In order to express an antireflection function effectively, a multiple antireflection layer is preferable, and in this case, a low-refractive-index layer and a high-refractiveindex layer are laminated alternately. In this case, it is preferable that a difference in the refractive index of the low-refractive-index layer and the high-refractive-index layer is 0.1 or more. Examples of the high-refractive-index layer include layers of ZnO, $TiO_2$, $CeO_2$, $Sb_2O_5$, $SnO_2$, $ZrO_2$, $Ta_2O_5$, and the like. Examples of the low-refractive-index layer include a $SiO_2$ layer.

An anti-fog layer, an anti-fouling layer, or a water-repellent layer may be formed on the antireflection layer, as desired. A method for forming the anti-fog layer, the anti-fouling layer, or the water-repellent layer is not particularly limited in terms of the treatment method, the treatment material, or the like as long as it does not give an adverse effect on the antireflection function, and known anti-fog treatment methods, anti-fouling treatment methods, water-repellent treatment methods, and materials can be used. Examples of the anti-fog treatment method or the anti-fouling treatment method include a method of covering a surface with a surfactant, a method of adding a hydrophilic film to a surface to perform water absorption, a method of covering a surface with fine unevenness to enhance water absorption, a method of using a photocatalytic activity to perform water absorption, and a method of carrying out a super-water-repellent treatment to prevent the adhesion of water droplets. In addition, examples of the water-repellent treatment method include a method of forming a water-repellent treatment layer with a fluorine-containing silane compound or the like by vapor deposition or sputtering, and a method of dissolving a fluorine-containing silane compound in a solvent, followed by coating, to form a water-repellent treatment layer.

[Plastic Polarized Lens]

A plastic polarized lens can be formed by forming a base material layer including a molded product formed by curing the polymerizable composition of the present embodiment on at least one surface of a polarized film.

The polarized film in the present embodiment can be constituted with a thermoplastic resin. Examples of the thermoplastic resin include a thermoplastic polyester, a thermoplastic polycarbonate, a thermoplastic polyolefin, and a thermoplastic polyimide. From the viewpoints of water resistance, heat resistance, and mold processability, the thermoplastic polyester or the thermoplastic polycarbonate is preferable, and the thermoplastic polyester is more preferable.

Examples of the thermoplastic polyester include polyethylene terephthalate, polyethylene naphthalate, and polybutylene terephthalate, and from viewpoints of water resistance, heat resistance, and mold processability, polyethylene terephthalate is preferable.

Specific examples of the polarized film include a dichroic dye-containing thermoplastic polyester polarized film, an iodine-containing polyvinyl alcohol polarized film, and a dichroic dye-containing polyvinyl alcohol polarized film.

The polarized film may be used after undergoing a heating treatment for drying and stabilization.

Moreover, the polarized film may be used after undergoing one or more pretreatments selected from a primer coating treatment, a chemical treatment (a treatment with a chemical such as a gas or an alkali), a corona discharge treatment, a plasma treatment, an ultraviolet irradiation treatment, an electron beam irradiation treatment, a surface roughening treatment, a burning treatment, and the like. Among such pretreatments, one or more treatments selected from the primer coating treatment, the chemical treatment, the corona discharge treatment, and the plasma treatment are particularly preferable.

The plastic polarized lens of the present embodiment can be obtained by providing a base material layer obtained by curing the polymerizable composition of the present embodiment on at least one surface of such the polarized film.

A process for producing the plastic polarized lens is not particularly limited, but preferred examples thereof include a cast polymerization method.

Examples of a process for producing the plastic polarized lens of the present embodiment include:

a step of fixing a polarized film in a lens-forming cast in a state where the polarized film is separated from a mold, a step of injecting the polymerizable composition to at least one of pores formed between the polarized film and the mold, and a step of polymerizing and curing the polymerizable composition to laminate a base material layer on at least one surface of the polarized film.

The lens-forming cast is generally formed of two glass molds held together by a gasket. The polarized film is arranged into a space in the lens-forming cast so that the surface of the film is made parallel to the internal surface of the front side mold, which faces the surface of the film. Space units are formed between the polarized film and the mold. Further, the polarized film may be shaped in advance.

The polymerization condition of the polymerizable composition varies depending on the composition of the polymerizable composition, the type and used amount of a catalyst, the shape of a mold, and the like, but the polymerization is usually performed at a temperature of 5° C. to 140° C. for 1 to 50 hours. Depending on cases, it is preferable that curing is performed by maintaining or slowly raising a temperature in the range of 5° C. to 130° C. for 1 to 25 hours.

The laminate obtained through curing by polymerization can be released from the mold to obtain the plastic polarized lens of the present embodiment.

In the present embodiment, the laminate after polymerization and release may be subjected to a heating treatment such as annealing, as desired. From the viewpoint of the effects of the present invention, the treatment is performed at a treatment temperature between 90° C. to 150° C., but is preferably performed at 110° C. to 130° C., and more preferably performed at 115° C. to 125° C. The treatment time is in the range of 1 to 10 hours, and preferably in the range of 2 to 5 hours, from the viewpoint of the effects of the present invention.

In addition, the coating layer which is the same as the plastic eyeglass lens may be formed on the surface of the obtained base material layer.

EXAMPLES

Next, the present invention will be described in more details with reference to Examples, but the present invention is not restricted to these Examples. In addition, evaluation of a molded product (plastic lens) formed of a cured resin was carried out by the following method.

<Evaluation Method>

Refractive index and Abbe's number: These were measured at 20° C. using a refractometer, KPR-20 (manufactured by Kalnew Optical Industries, Ltd.).

Heat resistance (glass transition temperature: Tg): This was measured by a TMA penetration method (a load of 50 g, a pinpoint of 0.5 mmφ, and a temperature rising rate of 10° C./min) using a thermomechanical measuring device, TMA-60, manufactured by Shimadzu Corporation.

Releasability: The releasability of a plastic lens from a glass mold was evaluated in accordance with the following criteria.

A: Very good (natural release or releasability equivalent thereto)

B: Good (Releasable by simple releasing operation)

C: Poor (Damages on a mold or a lens)

Transparency: The transparency of the plastic lens was visually evaluated in accordance with the following criteria.

B: Good (Not turbidity with a lamp)

C: Poor (Turbidity with a lamp)

<Internal Release Agent>

As the internal release agent, A to E described in Table 1 were used.

TABLE 1

| | Release agent | Content (%) | Weight-average molecular weight | Silicone unit content ratio (%) | Polyether unit content (%) |
|---|---|---|---|---|---|
| Internal release agent A | Polyether-modified silicone compound (b1) | 68 | 9,000 | 44 | 56 |
| | Polyether-modified silicone compound (b2) | 32 | 15,000 | 43 | 57 |
| Internal release agent B | Polyether-modified silicone compound (b1) | 72 | 8,000 | 83 | 17 |
| | Polyether-modified silicone compound (b2) | 28 | 2,000 | 43 | 57 |
| Internal release agent C | Polyether-modified silicone compound (b1) | 10 | 15,400 | 85 | 15 |
| | Polyether-modified silicone compound (b1) | 31 | 7,100 | 65 | 35 |
| | Polyether-modified silicone compound (b1) | 12 | 2,600 | 33 | 67 |
| | Polyether-modified silicone compound (b1) | 47 | 1,000 | 14 | 86 |
| Internal release agent D | Polyether-modified silicone compound (b1) | 34 | 9,000 | 44 | 56 |
| | Polyether-modified silicone compound (b1) | 5 | 15,400 | 85 | 15 |
| | Polyether-modified silicone compound (b1) | 15 | 7,100 | 65 | 35 |
| | Polyether-modified silicone compound (b1) | 6 | 2,600 | 33 | 67 |
| | Polyether-modified silicone compound (b1) | 24 | 1,000 | 14 | 86 |
| | Polyether-modified silicone compound (b2) | 16 | 15,000 | 43 | 57 |
| Internal release agent E | Polyether-modified silicone compound (b2) | 100 | 78,000 | 17 | 83 |

Example 1

0.658 parts by weight of "a reaction product of 2-(2,4-dihydroxyphenyl)-4,6-bis-(2,4-dimethylphenyl)-1,3,5-triazine and (2-ethylhexyl)-glycidic ester" (product name Tinuvin 405 manufactured by BASF Corporation) as a UV absorber, 0.549 parts by weight of tetrabutylammonium bromide as a catalyst, 8.23 parts by weight of phenyl glycidyl ether, and 47.28 parts by weight of a mixture of 4-methylhexahydrophthalic anhydride and hexahydrophthalic anhydride (MH-700 manufactured by Shin-Nihon Rika Co., Ltd.) as a polymerization reactive compound were mixed under stirring at 20° C. to obtain a homogeneous solution. 44.49 parts by weight of a bisphenol A type epoxy resin (R139S manufactured by Mitsui Chemicals, Inc.) as a polymerization reactive compound was further added to the homogeneous solution, and the mixture was mixed under stirring at 20° C. to obtain a polymerizable composition. This polymerizable composition was degassed for 30 minutes under reduced pressure of <1 kPa (<1 mmHg), then 0.5 parts by weight (5,000 ppm) or 1.0 part by weight (10,000 ppm) of the internal release agent A as an internal release agent was added thereto as shown in Table 2, and the mixture was further degassed for 30 minutes under reduced pressure of <1 kPa (<1 mmHg).

A polymerizable composition including an internal release agent in the amount of 0 ppm, 5,000 ppm, or 10,000 ppm with respect to the polymerization reactive compound was each filtered over a PTFE-made filter having a pore diameter of 1 μm, injected into a lens-shaped cavity (center thickness of 1.2 mm) formed between glass molds and a tape, and sealed with a tape. This was put into a polymerization oven, slowly heated from 45° C. to 130° C. for 9 hours, and then held at 130° C. for 5 hours to perform polymerization. After cooling, the glass mold and the tape were peeled off, and a molded product (plastic lens) formed of a curable resin formed inside was taken out. The peeling was easily performed, whereby there were no problems such as breakage of the molded product (plastic lens) and damages on the glass mold. Further, the molded product (plastic lens) was colorless and transparent, and had a refractive index Ne of 1.54, an Abbe number νe of 40, a Tg of 120° C., and a density of 1.2 g/cm$^3$. The results from the confirmation of the releasability and the transparency are shown in Table 2.

Example 2

A molded product (plastic lens) was manufactured in the same manner as in Example 1, except that the internal release agent in Example 1 was changed to an internal release agent B and added in the addition amount shown in Table 2, and the releasability and the transparency were confirmed. The results are shown in Table 2.

Example 3

A molded product (plastic lens) was manufactured in the same manner as in Example 1, except that the internal release agent in Example 1 was changed to an internal release agent D and added in the addition amount shown in Table 2, and the releasability and the transparency were confirmed. The results are shown in Table 2.

Comparative Example 1

A molded product (plastic lens) was manufactured in the same manner as in Example 1, except that the internal release agent in Example 1 was changed to an internal release agent C and added in the addition amount shown in Table 2, and the releasability was confirmed. The results are shown in Table 2.

Comparative Example 2

A molded product (plastic lens) was manufactured in the same manner as in Example 1, except that the internal release agent in Example 1 was changed to an internal release agent E and added in the addition amount shown in Table 2, and the releasability and the transparency were confirmed. The results are shown in Table 2.

TABLE 2

| | | Addition amount (ppm) of internal release agent | | |
|---|---|---|---|---|
| | Item | 0 | 5,000 | 10,000 |
| Example 1 | Releasability | C | A | A |
| | Transparency | — | B | B |
| Example 2 | Releasability | C | B | A |
| | Transparency | — | B | B |
| Example 3 | Releasability | C | A | A |
| | Transparency | — | B | B |
| Comparative | Releasability | C | C | C |
| Example 1 | Transparency | — | — | — |
| Comparative | Releasability | C | A | A |
| Example 2 | Transparency | — | C | C |

Example 4

1.5 parts by weight (15,000 ppm) of 2-(2'-hydroxy-5'-t-octylphenyl)benzotriazole (Viosorb 583 manufactured by Kyodo Chemical Co., Ltd.) as a UV absorber, 0.015 parts by weight (150 ppm) of dibutyl tin (II) dichloride as a catalyst, and 51.99 parts by weight of m-xylylene diisocyanate as a polymerization reactive compound were mixed under stirring at 20° C. to obtain a homogeneous solution. 47.99 parts by weight of 4-mercaptomethyl-1,8-dimercapto-3,6-dithiaoctane as a polymerization reactive compound was further added to the homogeneous solution, and the mixture was mixed under stirring at 20° C. This polymerizable composition was degassed for 30 minutes under reduced pressure of <1 kPa (<1 mmHg), then 0.05 parts by weight (500 ppm) of the internal release agent A was added thereto as shown in Table 3, and the mixture was further degassed for 30 minutes under reduced pressure of <1 kPa (<1 mmHg).

A polymerizable composition including an internal release agent in the amount of 0 ppm or 500 ppm with respect to the polymerization reactive compound was each filtered over a PTFE-made filter having a pore diameter of 1 μm, injected into a lens-shaped cavity (center thickness of 1.2 mm) formed between glass molds and a tape, and sealed with a tape. This was put into a polymerization oven, slowly heated from 25° C. to 120° C. for 19 hours, and then held at 120° C. for 2 hours to perform polymerization. After cooling, the glass mold and the tape were peeled off, and a molded product (plastic lens) formed of a curable resin formed inside was taken out. The obtained molded product (plastic lens) was colorless and transparent, and had a refractive index Ne of 1.67, an Abbe number νe of 31, and a Tg of 98° C. The evaluation results of the releasability and the transparency are shown in Table 3.

Example 5

1.5 parts by weight (15,000 ppm) of 2-(2'-hydroxy-5'-t-octylphenyl)benzotriazole (Viosorb 583 manufactured by Kyodo Chemical Co., Ltd.) as a UV absorber, 0.05 parts by weight (500 ppm) of dibutyl tin (II) dichloride as a catalyst, and 50.6 parts by weight of 2,5 (6)-bis(isocyanatomethyl) bicyclo-[2.2.1]-heptane as a polymerization reactive compound were mixed under stirring at 20° C. to obtain a homogeneous solution. 23.9 parts by weight of pentaerythritoltetrakis(3-mercaptopropionate) and 25.5 parts by weight of 4-mercaptomethyl-1,8-dimercapto-3,6-dithiaoctane as a polymerization reactive compound were further added to the homogeneous solution, and the mixture was mixed under stirring at 20° C. to obtain a homogeneous polymerizable composition. This polymerizable composition was degassed for 30 minutes under reduced pressure of <1 kPa (<1 mmHg), then 0.05 parts by weight (500 ppm) of the internal release agent A was added thereto as shown in Table 3, and subsequently, the mixture was further degassed for 30 minutes under reduced pressure of <1 kPa (<1 mmHg).

A polymerizable composition including an internal release agent in the amount of 0 ppm or 500 ppm with respect to the polymerization reactive compound was each filtered over a PTFE-made filter having a pore diameter of 1 μm, injected into a lens-shaped cavity (center thickness of 1.2 mm) formed between glass molds and a tape, and sealed with a tape. This was put into a polymerization oven, slowly heated from 25° C. to 120° C. for 19 hours, and then held at 120° C. for 2 hours to perform polymerization. After cooling, the glass mold and the tape were peeled off, and a molded product (plastic lens) formed of a curable resin formed inside was taken out. The obtained molded product (plastic lens) was colorless and transparent, and had a refractive index Ne of 1.60, an Abbe number νe of 40, and a Tg of 114° C. The evaluation results of the releasability and the transparency are shown in Table 3.

Example 6

1.5 parts by weight (15,000 ppm) of 2-(2'-hydroxy-5'-t-octylphenyl)benzotriazole (Viosorb 583 manufactured by Kyodo Chemical Co., Ltd.) as a UV absorber, 0.05 parts by weight (500 ppm) of dibutyl tin (II) dichloride as a catalyst, and 50.6 parts by weight of m-xylylene diisocyanate as a polymerization reactive compound were mixed under stirring at 20° C. to obtain a homogeneous solution. 49.4 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, and 4,8-dimercaptomethyl-1,11-dimercapto-3,6,9-trithiaundecane as a polymerization reactive compound were further added to the homogeneous solution, and the mixture was mixed under stirring at 20° C. to obtain a homogeneous polymerizable composition. This polymerizable composition was degassed for 30 minutes under reduced pressure of <1 kPa (<1 mmHg), then 0.05 parts by weight (500 ppm) of the internal release agent A was added thereto as shown in Table 3, and subsequently, the mixture was further degassed for 30 minutes under reduced pressure of <1 kPa (<1 mmHg).

A polymerizable composition including an internal release agent in the amount of 0 ppm or 500 ppm with respect to the polymerization reactive compound was each filtered over a PTFE-made filter having a pore diameter of 1 μm, injected into a lens-shaped cavity (center thickness of 1.2 mm) formed between glass molds and a tape, and sealed with a tape. This was put into a polymerization oven, slowly heated from 25° C. to 120° C. for 19 hours, and then held at 120° C. for 2 hours to perform polymerization. After cooling, the glass mold and the tape were peeled off, and a molded product (plastic lens) formed of a curable resin formed inside was taken out. The obtained molded product (plastic lens) was colorless and transparent, and had a refractive index Ne of 1.67, an Abbe number νe of 31, and a Tg of 98° C. The evaluation results of the releasability and the transparency are shown in Table 3.

TABLE 3

| | | Addition amount (ppm) of internal release agent | |
|---|---|---|---|
| | Item | 0 | 500 |
| Example 4 | Releasability | C | B |
| | Transparency | — | B |
| Example 5 | Releasability | C | B |
| | Transparency | — | B |
| Example 6 | Releasability | C | B |
| | Transparency | — | B |

Example 7

0.3 parts by weight (15,000 ppm) of 2-(2'-hydroxy-5'-t-octylphenyl)benzotriazole (Viosorb 583 manufactured by Kyodo Chemical Co., Ltd.) as a UV absorber, 0.04 parts by weight (400 ppm) of dimethyl tin (II) dichloride as a catalyst, 29.2 parts by weight of 2,5(6)-bis(isocyanatomethyl)bicyclo-[2.2.1]-heptane as a polymerization reactive compound, and 19.45 parts by weight of hexamethylene diisocyanate were mixed under stirring at 20° C. to obtain a homogeneous solution. 23.5 parts by weight of pentaerythritoltetrakis(3-mercaptopropionate) and 27.58 parts by weight of 4-mercaptomethyl-1,8-dimercapto-3,6-dithiaoctane as a polymerization reactive compound were further added thereto, and the mixture was mixed under stirring at 20° C. to obtain a homogeneous polymerizable composition. This polymerizable composition was degassed for 30 minutes under reduced pressure of <1 kPa (<1 mmHg), then 0.001 parts by weight (10 ppm) of the internal release agent A was added thereto as shown in Table 4, and subsequently, the mixture was further degassed for 30 minutes under reduced pressure of <1 kPa (<1 mmHg).

A polymerizable composition including an internal release agent in the amount of 0 ppm or 10 ppm with respect to the polymerization reactive compound was each filtered over a PTFE-made filter having a pore diameter of 1 μm, injected into a lens-shaped cavity (center thickness of 1.2 mm) formed between glass molds and a tape, and sealed with a tape. This was put into a polymerization oven, slowly heated from 25° C. to 120° C. for 15 hours, and then held at 120° C. for 4 hours to perform polymerization. After cooling, the glass mold and the tape were peeled off, and a molded product (plastic lens) formed of a curable resin formed inside was taken out. The obtained molded product (plastic lens) was colorless and transparent, and had a refractive index Ne of 1.60, an Abbe number νe of 39, and a Tg of 92° C. The evaluation results of the releasability and the transparency are shown in Table 4.

Example 8

1.5 parts by weight (15,000 ppm) of 2-(2'-hydroxy-5'-t-octylphenyl)benzotriazole (Viosorb 583 manufactured by Kyodo Chemical Co., Ltd.) as a UV absorber and 58.9 parts by weight of bis(4-isocyanatocyclohexyl)methane were mixed under stirring at 20° C. to obtain a homogeneous solution. 41.1 parts by weight of a mixture of 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane and 0.15 parts by weight (1,500 ppm) of dibutyl tin (II) dichloride were further added to the homogeneous solution, and the mixture was mixed under stirring at 20° C. to obtain a mixed liquid. This mixed liquid was degassed for 30 minutes at 600 Pa, then 0.001 parts by weight (10 ppm) of the internal release agent A was added thereto as shown in Table 4, and subsequently, the mixture was further degassed for 30 minutes under reduced pressure of <1 kPa (<1 mmHg).

A polymerizable composition including an internal release agent in the amount of 0 ppm or 10 ppm with respect to the polymerization reactive compound was each filtered over a PTFE-made filter having a pore diameter of 1 μm, and then injected into a lens-shaped glass mold having a center thickness of 1.2 mm and a diameter of 80 mm. This mold was put into a polymerization oven, and slowly heated from 20° C. to 130° C. for 21 hours to perform polymerization. After completion of the polymerization, the mold was taken out from the oven. The obtained plastic lens was further subjected to an annealing treatment at 130° C. for 2 hours. The obtained plastic lens having a thickness of 1.2 mm was transparent, had a refractive index (Ne) of 1.60, an Abbe number (νe) of 39, and a Tg of 136° C., and was suitable as a transparent resin for an optical material. The evaluation results of the releasability and the transparency are shown in Table 4.

Reference Example 1

0.05 parts by weight (500 ppm) of 2-hydroxy-4-methoxybenzophenone as a UV absorber, 3.0 parts by weight (30,000 ppm) of 1,1-di(t-hexylperoxy)cyclohexane as a polymerization initiator, and 100.0 parts by weight of diethylene glycol bis(allyl carbonate) as a polymerization reactive compound were mixed under stirring at 20° C. to obtain a polymerizable composition. This polymerizable composition was degassed for 30 minutes under reduced pressure of <1 kPa (<1 mmHg), then 0.001 parts by weight (10 ppm) of the internal release agent A was added thereto as shown in Table 4, and subsequently, the mixture was further degassed for 30 minutes under reduced pressure of <1 kPa (<1 mmHg).

A polymerizable composition including an internal release agent in the amount of 0 ppm or 10 ppm with respect to the polymerization reactive compound was each filtered over a PTFE-made filter having a pore diameter of 1 μm, injected into a lens-shaped cavity (center thickness of 1.2 mm) formed between glass molds and a tape, and sealed with a tape. This was put into a polymerization oven, slowly heated from 75° C. to 130° C. for 20 hours, and then held at 130° C. for 3 hours to perform polymerization. After cooling, the glass mold and the tape were peeled off, and a molded product (plastic lens) formed of a curable resin formed inside was taken out. The obtained molded product (plastic lens) was colorless and transparent, and had a refractive index Ne of 1.50 and an Abbe number νe of 58. The evaluation results of the releasability and the transparency are shown in Table 4.

Reference Example 2

0.05 parts by weight (500 ppm) of 2-hydroxy-4-methoxybenzophenone as a UV absorber, 3.0 parts by weight (30,000 ppm) of 1,1-di(t-hexylperoxy)cyclohexane as a polymerization initiator, 25.0 parts by weight of divinylbenzene as a polymerization reactive compound, and 75.0 parts by weight of ethoxybisphenol A diacrylate (NKester A-BPE-10 (manufactured by Shin-Nakamura Chemical Co.)) were mixed under stirring at 20° C. to obtain a homogeneous polymerizable composition. This polymerizable composition was degassed for 30 minutes under reduced pressure of <1 kPa (<1 mmHg), then 0.001 parts by weight (10 ppm) of the internal release agent A was added thereto as shown in Table 4, and subsequently, the mixture was further degassed for 30 minutes under reduced pressure of <1 kPa (<1 mmHg).

A polymerizable composition including an internal release agent in the amount of 0 ppm or 10 ppm with respect to the polymerization reactive compound was each filtered over a PTFE-made filter having a pore diameter of 1 μm, injected into a lens-shaped cavity (center thickness of 1.2 mm) formed between glass molds and a tape, and sealed with a tape. This was put into a polymerization oven, slowly heated from 75° C. to 130° C. for 20 hours, and then held at 130° C. for 3 hours to perform polymerization. After cooling, the glass mold and the tape were peeled off, and a molded product (plastic lens) formed of a curable resin formed inside was taken out. The obtained molded product (plastic lens) was colorless and transparent, and had a refractive index Ne of 1.56 and an Abbe number νe of 38. The evaluation results of the releasability and the transparency are shown in Table 4.

TABLE 4

| | | Addition amount (ppm) of internal release agent | |
|---|---|---|---|
| | Item | 0 | 10 |
| Example 7 | Releasability | C | A |
| | Transparency | — | B |
| Example 8 | Releasability | C | A |
| | Transparency | — | B |
| Reference Example 1 | Releasability | A | A |
| | Transparency | B | B |
| Reference Example 1 | Releasability | A | A |
| | Transparency | B | B |

This application claims priority from Japanese Patent Application No. 2017-043493 filed on Mar. 8, 2017, the content of which is incorporated herein by reference in its entirety.

The invention claimed is:

1. A polymerizable composition comprising:

a polymerization reactive compound (A); and an internal release agent (B) including a polyether-modified silicone compound (b1) represented by General Formula (1) and a polyether-modified silicone compound (b2) represented by General Formula (2), wherein the polymerization reactive compound (A) is one or more compounds selected from a polyiso(thio)cyanate compound, a poly(thio)epoxy compound, a polyoxetanyl compound, a polythietanyl compound, an alkyne compound, a poly(thi)ol compound, a polyamine compound, an acid anhydride, and a polycarboxylic acid compound, (1)

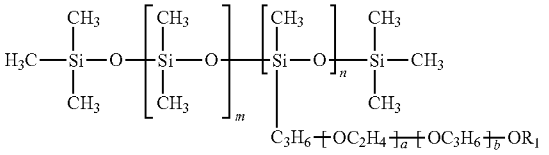

wherein, in Formula (1), m and n may be the same as or different from each other, and represent an integer of 1 or more; a and b may be the same as or different from each other, and represent an integer of 0 or more, provided that a case where both of a and b are 0 is excluded; and $R_1$ represents a linear or branched alkyl group having 1 to 6 carbon atoms or a hydrogen atom, (2)

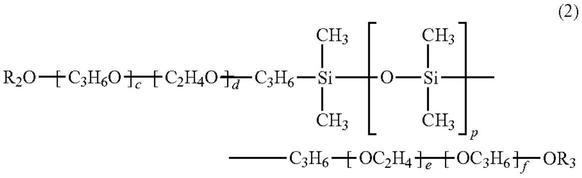

wherein, in Formula (2), p is an integer of 1 or more; c, d, e, and f may be the same as or different from each other, and represent an integer of 0 or more, provided that a case where all of c, d, e, and f are 0 is excluded; and $R_2$ and $R_3$ may be the same as or different from each other, and represent a linear or branched alkyl group having 1 to 6 carbon atoms or a hydrogen atom.

2. The polymerizable composition according to claim 1, wherein the polymerization reactive compound (A) is a combination of two compounds selected from a poly(thio)epoxy compound, an acid anhydride, a polyiso(thio)cyanate compound, and a poly(thi)ol compound.

3. The polymerizable composition according to claim 1, wherein the internal release agent (B) is included in the amount of $1\times10^{-1}$ to $5\times10^{4}$ ppm with respect to the polymerization reactive compound (A).

4. A molded product formed by curing the polymerizable composition according to claim 1.

5. An optical material comprising:

the molded product according to claim 4.

6. A plastic lens comprising:

the molded product according to claim 4.

7. A process for producing a plastic lens, comprising:

a step of cast-polymerizing the polymerizable composition according to claim 1.

* * * * *